(12) United States Patent
Willis

(10) Patent No.: US 11,379,661 B2
(45) Date of Patent: Jul. 5, 2022

(54) WORD VERIFICATION EDITING FOR SIMPLE AND DETAILED TEXT EDITING

(71) Applicant: Xerox Corporation, Norwalk, CT (US)

(72) Inventor: Keith L. Willis, Rochester, NY (US)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 16/821,055

(22) Filed: Mar. 17, 2020

(65) Prior Publication Data

US 2021/0294971 A1 Sep. 23, 2021

(51) Int. Cl.
*G06F 40/232* (2020.01)
*G06F 40/253* (2020.01)
*G06F 40/166* (2020.01)

(52) U.S. Cl.
CPC .......... *G06F 40/232* (2020.01); *G06F 40/166* (2020.01); *G06F 40/253* (2020.01)

(58) Field of Classification Search
None
See application file for complete search history.

(56) References Cited

U.S. PATENT DOCUMENTS

| | | | | |
|---|---|---|---|---|
| 9,881,010 | B1* | 1/2018 | Gubin | G06F 40/274 |
| 2005/0283726 | A1* | 12/2005 | Lunati | G06F 40/232 |
| | | | | 715/257 |
| 2011/0313757 | A1* | 12/2011 | Hoover | G06F 40/205 |
| | | | | 704/9 |
| 2012/0054672 | A1* | 3/2012 | McDowell | G09B 17/003 |
| | | | | 715/784 |
| 2012/0105455 | A1* | 5/2012 | Sharkey | G06F 40/106 |
| | | | | 345/473 |
| 2014/0280109 | A1* | 9/2014 | Zomet | G06F 40/166 |
| | | | | 707/728 |
| 2014/0331125 | A1* | 11/2014 | Tigchelaar | G06F 40/103 |
| | | | | 715/249 |
| 2021/0374340 | A1* | 12/2021 | Li | G06N 20/00 |

* cited by examiner

*Primary Examiner* — Frank D Mills
(74) *Attorney, Agent, or Firm* — Fay Sharpe, LLP

(57) ABSTRACT

Disclosed are methods of displaying and editing a document having editable text that allows for a wide variety of word verification features beyond merely correcting errors in spelling or grammar and allows for such detailed editing in a simple and user-friendly manner.

11 Claims, 21 Drawing Sheets

WORD VERIFICATION EDITING FOR SIMPLE AND DETAILED TEXT EDITING

BACKGROUND

The present disclosure is directed to word verification editing for simple and detailed text editing. More particularly, the present disclosure is directed to systems and methods for performing word verification editing in a simple and detailed text editing environment.

Conventional text editing systems and methods are generally limited to identifying incorrectly spelled words, incorrect punctuation, and poor grammar. Some of these systems and methods allow for the correction of such spelling and grammar. However, these systems and methods are limited in providing an opportunity for other spelling and grammatical verification. For example, a conventional text editing system might detect an incorrectly spelled word but it would not detect a word spelled correctly but is the wrong word.

Thus, it would be desirable to provide systems and methods for performing word verification editing that allows for a wide variety of word verification features beyond merely correcting errors in spelling or grammar. Further, it would be desirable to provide such systems and methods that allow for the detailed editing in a simple and user-friendly manner.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In accordance with a first aspect of the present disclosure, a method of editing a document having text is provided, comprising the steps of: (1) displaying, on a display, a portion of the document, wherein the portion of the document includes editable text; (2) determining a first and second portion of the editable text; (3) de-emphasizing, on the display, at least the second portion of the editable text; (4) emphasizing, on the display, the first portion of the editable text, wherein the first portion of the editable text includes a plurality of editable units; (5) marking, on the display, a first editable unit of the first portion of the editable text; (6) displaying, on the display, at least a first menu associated with the first editable unit based on a user-originated menu action; (7) optionally modifying, on the display, the first editable unit of the first portion of editable text based on the user-originated menu action; and (8) unmarking, on the display, the first editable unit of the first portion of the editable text.

In accordance with a second aspect of the present disclosure, a method of editing a document having text is provided, comprising the steps of: (1) displaying, on a display, a portion of the document, wherein the portion of the document includes editable text; (2) determining a first portion and second portion of the editable text, wherein each of the first and second portions include a plurality of editable units; (3) emphasizing the first portion; (4) de-emphasizing at least the second portion; (5) optionally modifying one or more of the editable units of the first portion; (6) determining a next sequential portion of the editable text, wherein the next sequential portion of the editable text includes a plurality of editable units; (7) emphasizing the next sequential portion of the editable text; (8) de-emphasizing at least a third portion, wherein the third portion includes at least the first portion; and (9) optionally modifying one or more of the editable units of the next sequential portion of editable text.

In accordance with a third aspect of the present disclosure, a system for editing a document having editable text is provided, comprising: a user input device; a display; and an editing device having a processor and a memory.

BRIEF DESCRIPTION OF THE DRAWINGS

The following is a brief description of the drawings which are presented for the purposes of illustrating the exemplary embodiments disclosed herein and not for the purposes of limiting the same.

DETAILED DESCRIPTION

Figure 1:
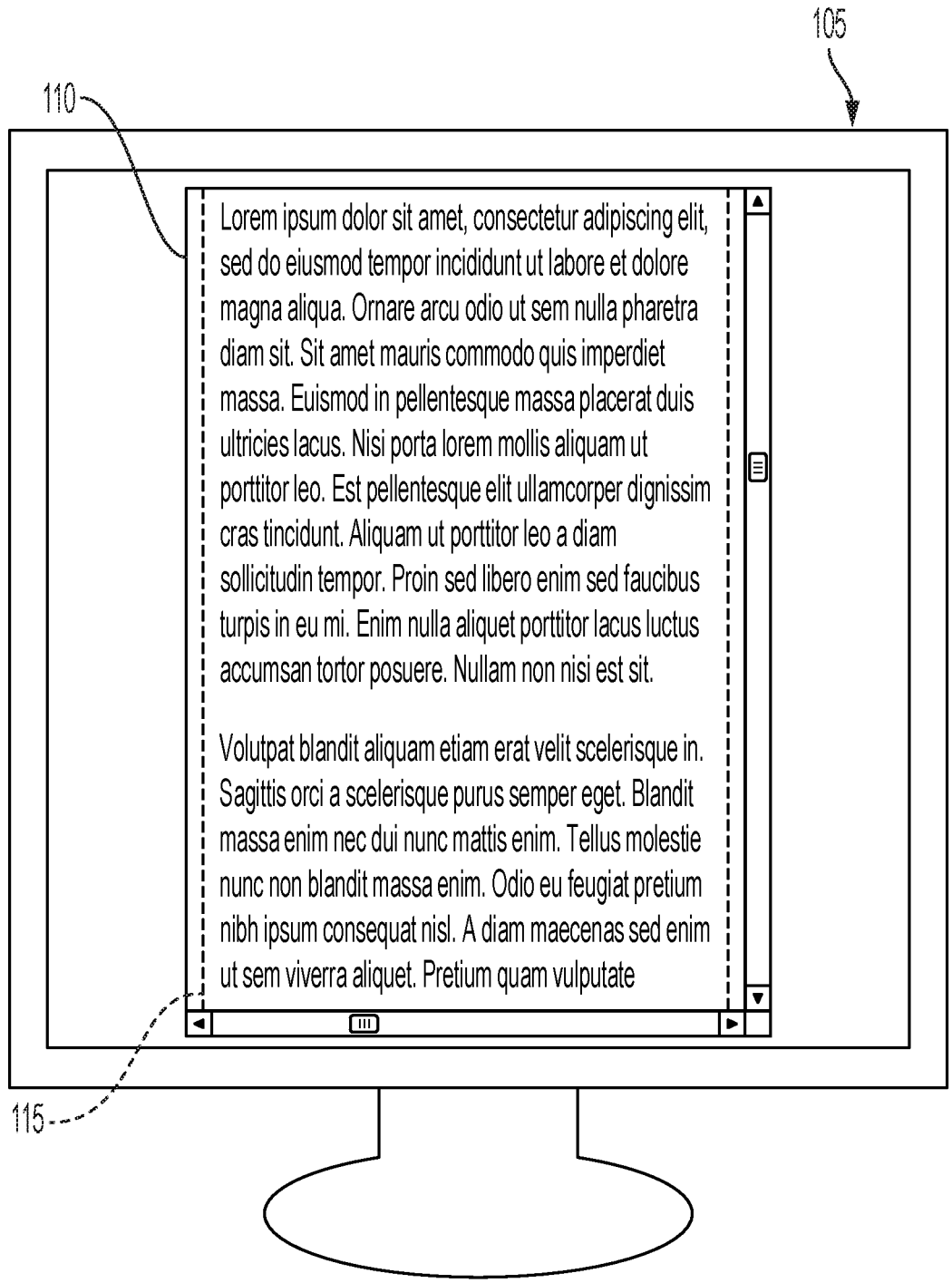
FIG. 1 illustrates a display that is displaying content for word verification editing in accordance with one aspect of this disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/components/steps and permit the presence of other ingredients/components/steps. However, such description should be construed as also describing compositions, articles, or processes as "consisting of" and "consisting essentially of" the enumerated ingredients/components/steps, which allows the presence of only the named ingredients/components/steps, along with any impurities that might result therefrom, and excludes other ingredients/components/steps.

The terms "mobile electronic device," "mobile device" and "portable electronic device" as used herein are interchangeably used and mean an electronic device that includes a processor and a non-transitory, computer-readable medium, and which is configured to be portable. Examples of portable electronic devices include smartphones, personal digital assistants, cameras, tablet devices, electronic readers, laptop computers, media players, satellite navigation devices and the like.

As discussed above, it is desirable to provide systems and processes for performing detailed word verification editing in a simple and user-friendly manner. Further, it is desirable to provide such systems and processes that allow for a wide range of word verification features, not just simple spell-checking and grammar-checking.

In accordance with one aspect of the present disclosure, a method of displaying on a display and editing a document having text is provided. In particular embodiments, the display may be, for example and without limitation, a computer monitor, a mobile device screen, a touchscreen mobile device, or a television. In some embodiments, the document may be, for example and without limitation, a text file, a word processor file, a Microsoft Word file, an OpenOffice Writer document file, a PDF file, a rice text format file, a LaTeX document file, a plain text file, a Microsoft Works file, a WordPerfect document file, a Keynote presentation file, an OpenOffice Impress presentation file, or a PowerPoint document file. In further embodiments, the document is any type of electronically-store media having text.

Figure 2:
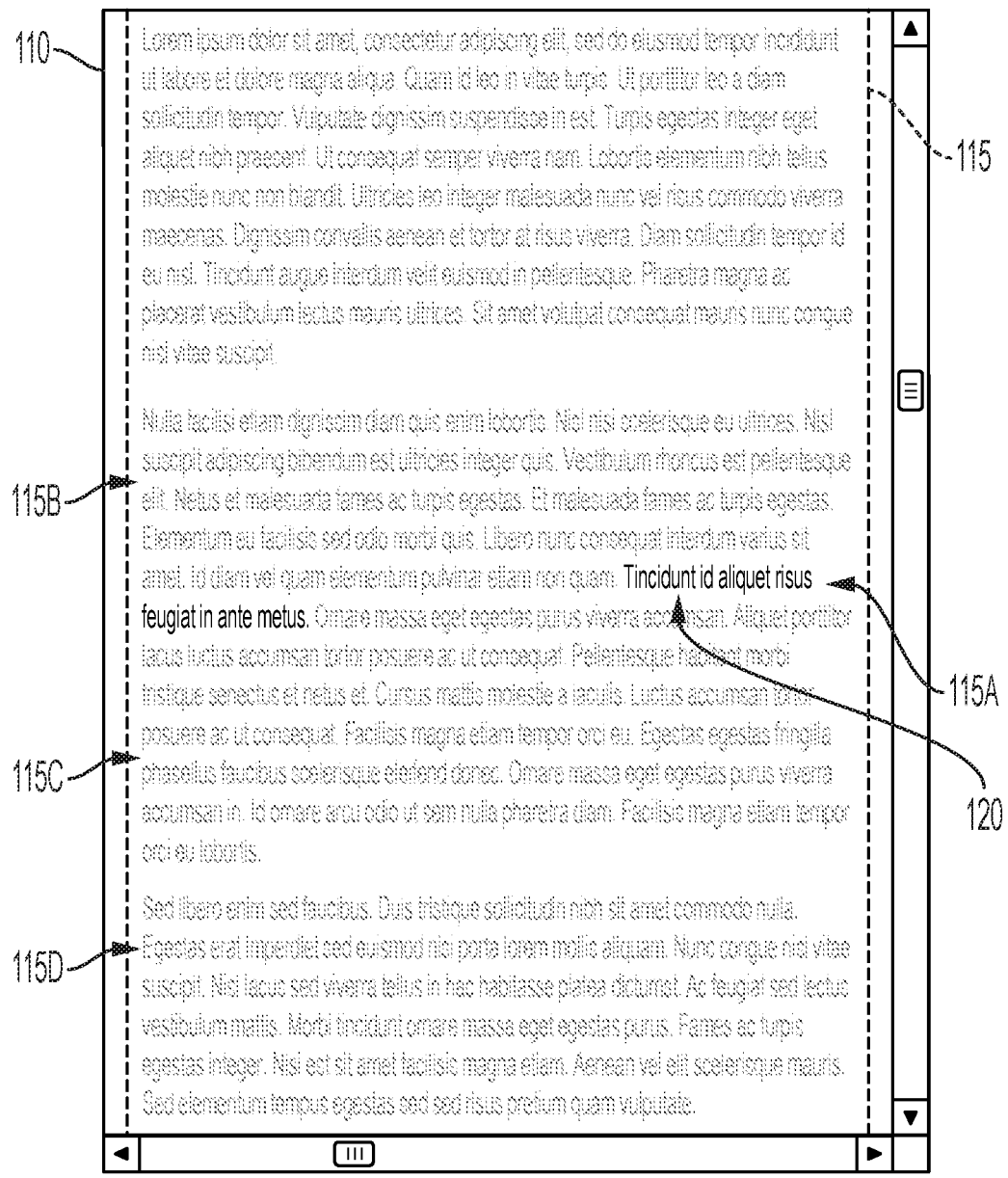
FIG. 2 illustrates content to be displayed on a display for word verification editing in accordance with another aspect of this disclosure.

With reference to FIG. 1, the method includes a first step of displaying on a display 105 a portion of a document 110 including editable text 115. Then, with reference to FIG. 2, the method includes determining at least a first portion 115A and a second portion 115B of the editable text 115. In some embodiments, the method includes determining at least a third portion 115C of the editable text 115. For example, the first portion 115A of editable text 115 may be a subset of the editable text 115, such as single sentence to be edited by an associated user. In some embodiments, the second portion 115B may be editable text 115 preceding or following the first portion 115A, and the third portion 115C may be editable text 115 preceding or following the first portion 115A. As illustrated in FIG. 2, the second portion 115B comprises editable text 115 preceding the first portion 115A and the second portion 115C comprises editable text 115 following the first portion 115A. Further, the preceding and/or following portions 115B, 115C can include editable text 115 within the same paragraph at the first portion 115A, or may include text in separate paragraphs, e.g., portion 115D.

With further reference to FIG. 2, the method can include the step of emphasizing and/or de-emphasizing on the display one or more portions 115A, 115B, 115C, 115D of the editable text 115. As illustrated in FIG. 2, the first portion 115A is emphasized by maintaining its font color, whereas the other portions 115B, 115C, 115D of the visible editable text 115 is de-emphasized by changing its font color to a shade of grey. Although the steps of emphasizing and de-emphasizing are illustrated herein as changes in font color, other methods of emphasizing and/or de-emphasizing text are contemplated, including, for example and without limitation, by highlighting text, changing the text background, underlining, bolding, italicizing, and/or combinations thereof.

In accordance with certain aspects of the present disclosure, the editable text 115 includes a plurality of editable units 120. For example, the editable units 120 may be individual words and/or individual punctuation marks. Thus, the step of determining one or more portions 115A, 115B, 115C, 115D of the editable text 115 includes determining a subset of editable units 120 of the editable text 115. In other words, the first portion 115A, second portion 115B, and any additional portions 115C, 115D, each comprise one or more editable units 120.

Figure 3A:
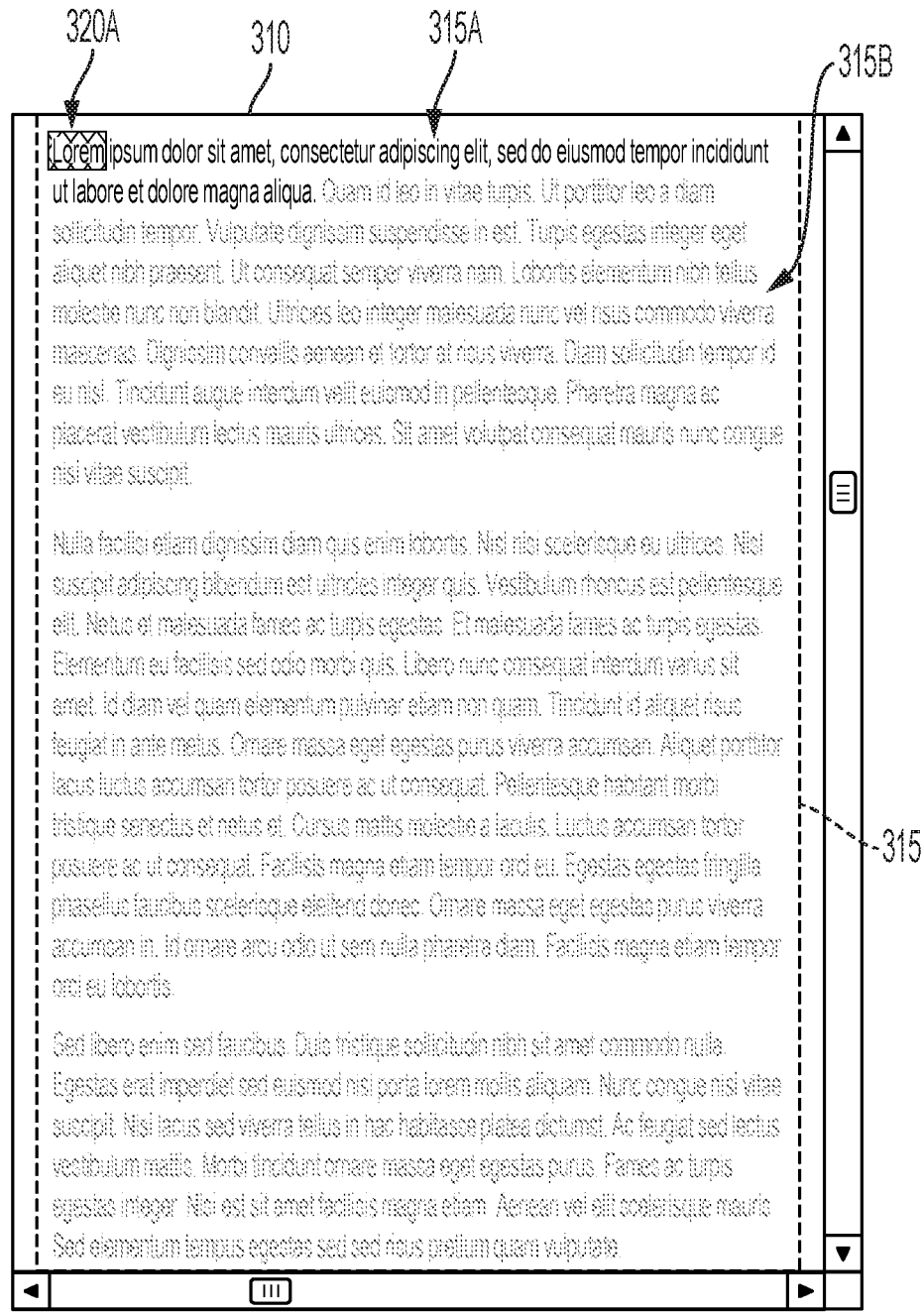
FIGS. 3A-3F illustrate the sequential word verification editing and nested menus in accordance with one aspect of the present disclosure.

Turning now to FIGS. 3A-3F, in accordance with a next aspect of the present disclosure, the method includes sequentially marking and editing, on the display (not shown), each editable unit (e.g., editable units 320A, 320B, 320C) of the first portion 315A of editable text 315. For example, FIG. 3A illustrates a portion of a document 310 to be displayed on a display (not shown) that includes editable text 315. The editable text includes a first portion 315A, which comprises a plurality of editable units and that has been emphasized, and a second portion 315B that has been de-emphasized. As shown in FIG. 3A, a first editable unit 320A of the first portion 315A of the editable text 315 has been marked, i.e., marked for potential editing. In some embodiments, the editable units may be marked via highlighting; however, other methods of marking are contemplated, including, for example and without limitation, by changing the font color, changing the text background, underlining, bolding, italicizing, and/or combinations thereof.

Figure 3B:
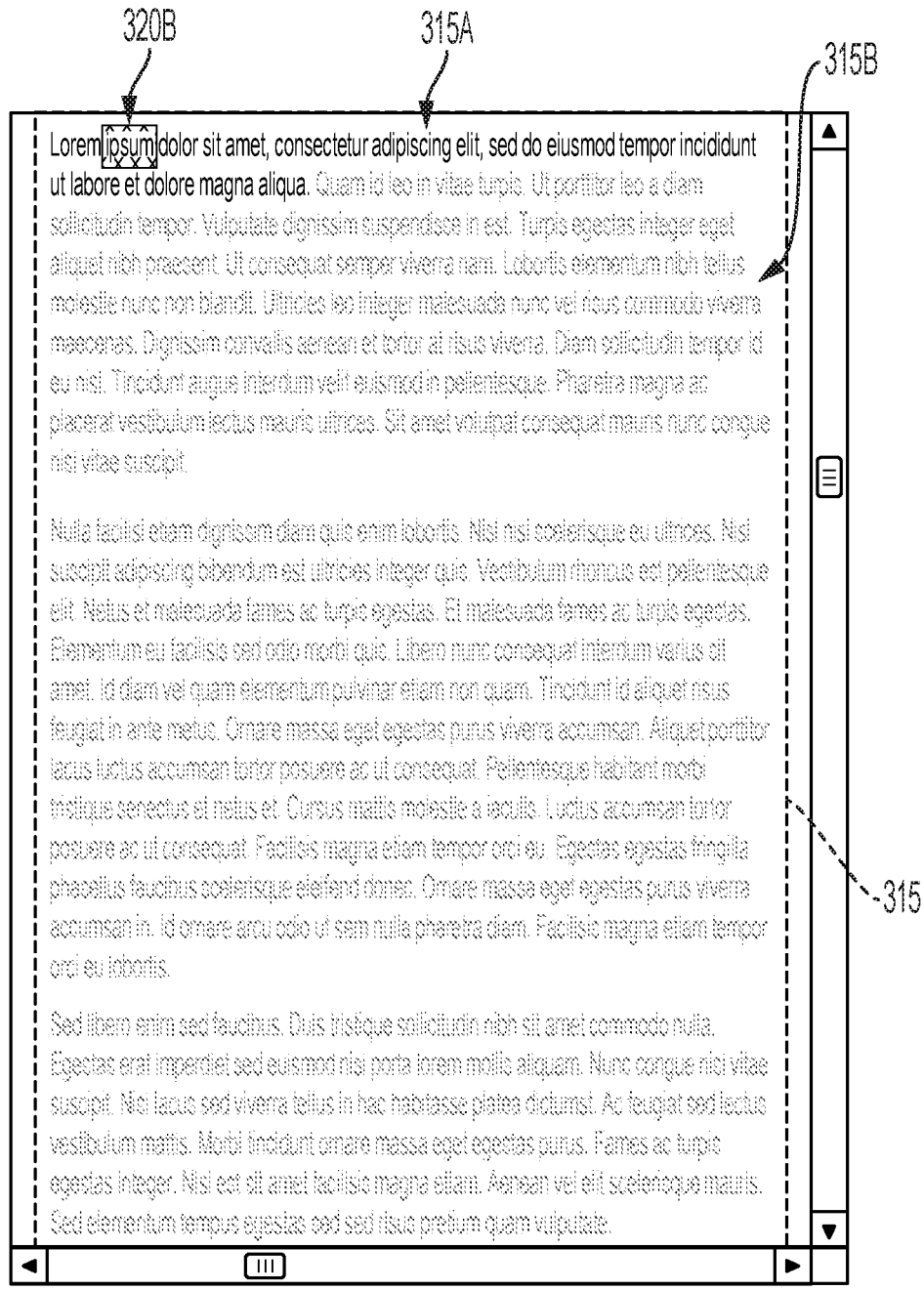
Figure 3C:
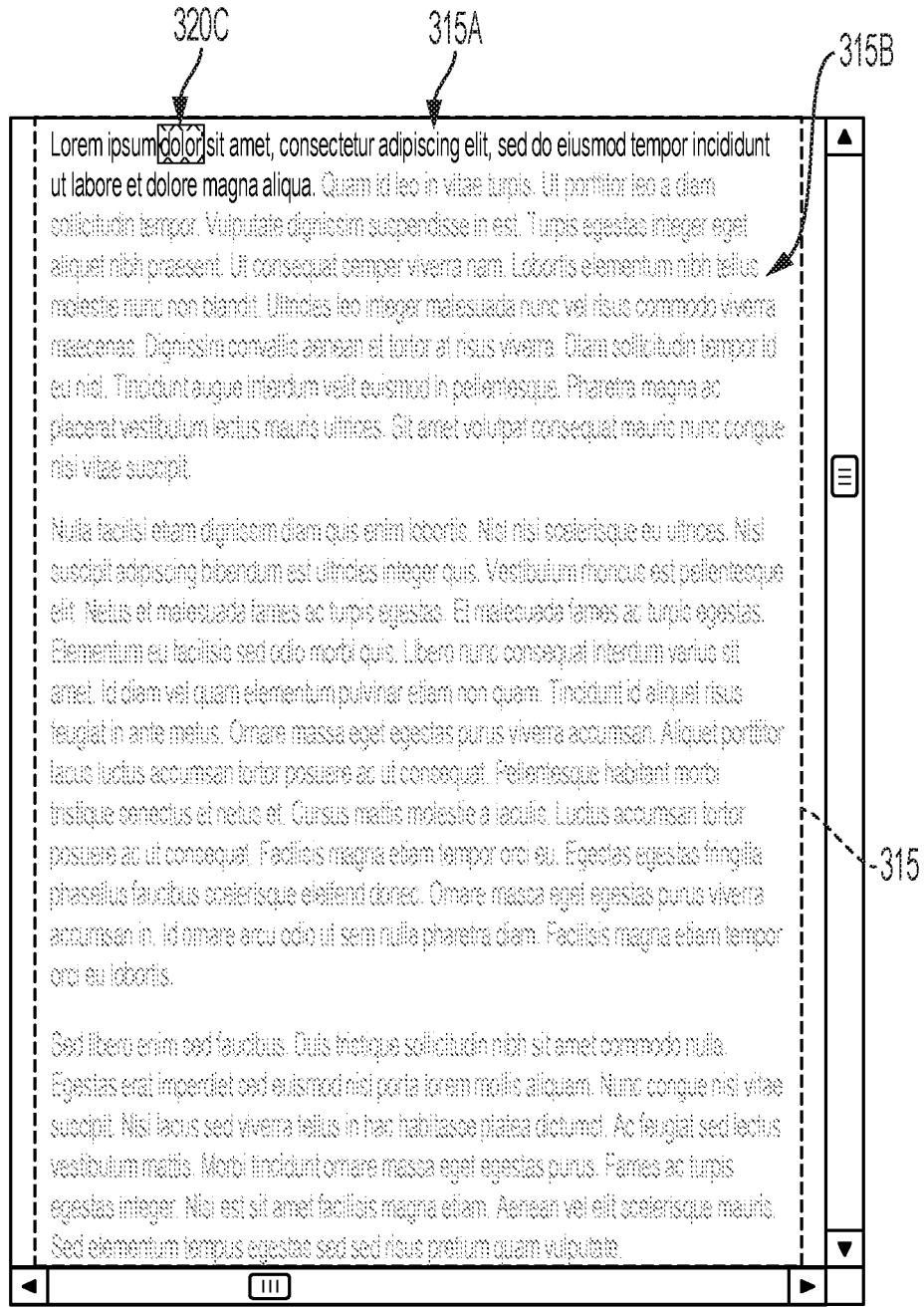

With reference to FIGS. 3B and 3C, these figures illustrate the sequential marking and unmarking of editable units 320A, 320B, 320C of the first portion 315A of editable text 315. That is, the methods of editing a document in accordance with certain aspects of the present disclosure may include unmarking, on the display (not shown), a previously marked editable unit 320A, 320B, 320C. For example, in FIG. 3A, a first editable unit 320A of the first portion 315A is marked as shown, but then unmarked in FIG. 3B. As shown in FIG. 3B, a second editable unit 320B of the first portion 315A is marked. Similarly, as shown in FIG. 3C, the second editable unit 320B is unmarked and a third editable unit 320C is marked for potential editing. The steps of sequentially marking and unmarking editable units, e.g. units 320A, 320B, 320C, may be repeated for as many editable units exist within the first portion 315A, and then repeated for each subsequent portion of editable text 315 displayed for editing.

In particular embodiments, the steps of marking and unmarking an editable unit 320A, 320B, 320C are triggered by a user-originated editing action. For example, a first editable unit 320A may be marked on the display automatically and once an associated user has completed edits of that editable unit 320A, the user may initiate a user-originated editing action that causes the first editable unit 320A to become unmarked and the next sequential editable unit 320B to become marked. In some embodiments, the user-originated editing action may be, for example, a user input received from a computer mouse or keyboard.

Figure 3D:
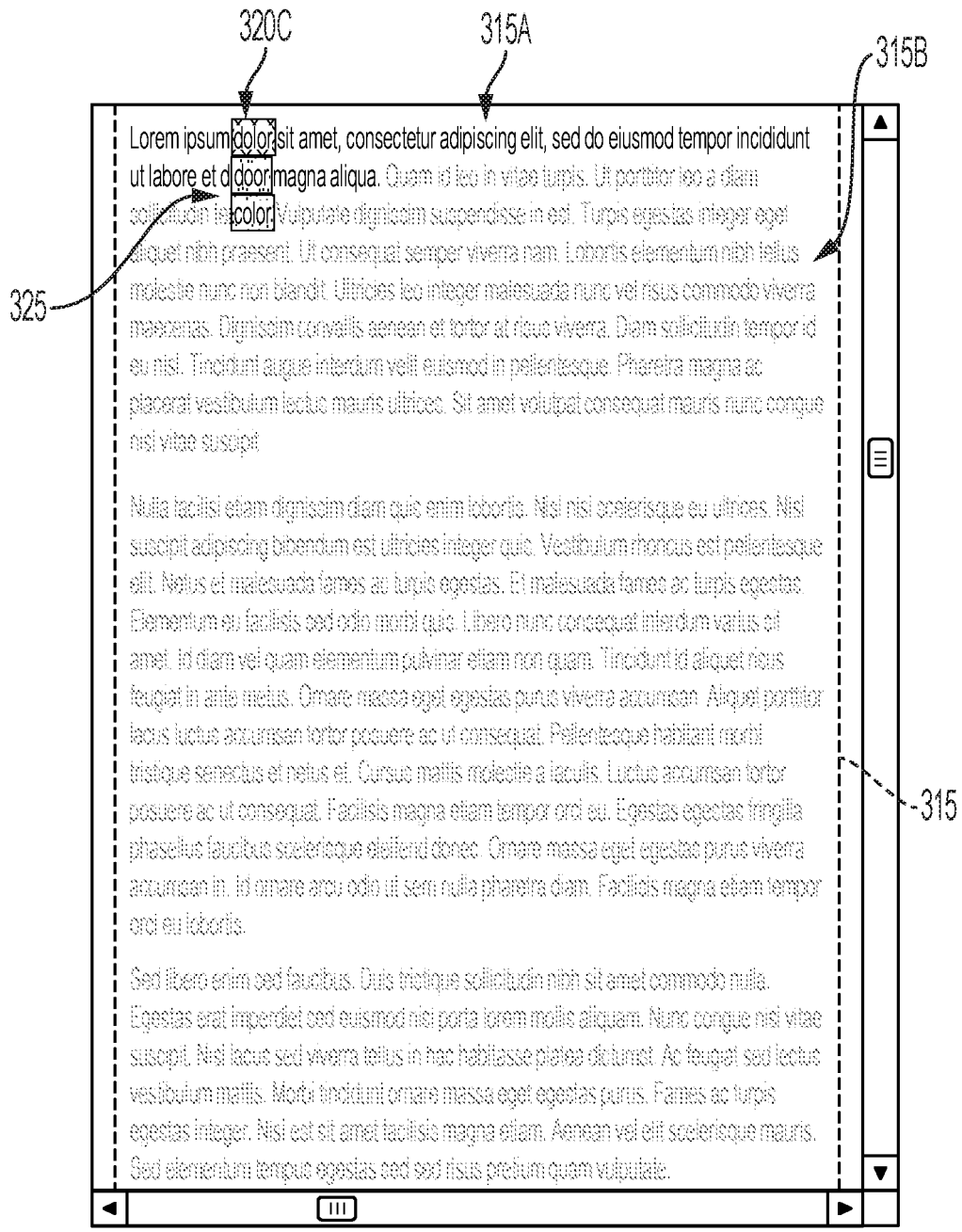

With reference to FIG. 3D, the methods disclosed herein may include the step of displaying, on the display (not shown), at least a first menu 325 associated with an editable unit 320C of the first portion 315A of editable text 315. As illustrated, the menu 325 is proximately located to the marked editable unit 320C. That is, the menu 325 is aligned with and below the marked editable unit 320C. The menu 325 may be automatically emphasized, on the display, in a different or similar manner to the editable unit 320C. For example, the first menu 325 may be displayed in a different highlighted color. In particular embodiments, the first menu 325 associated with any marked editable unit (e.g., unit 320C in FIG. 3D) includes recommended alternate text (i.e., options for potential misspelled or incorrect words).

In particular embodiments, the step of displaying, on the display, at least a first menu 325 associated with an editable unit is triggered by a user-originated menu action. For example, once an editable unit 320C is marked, the user may initiate a user-originated menu action that causes the first menu 325 to be displayed. In some embodiments, the user-originated menu action may be, for example, a user input received from a computer mouse or keyboard.

Further, the user may optionally modify the first editable unit 320C by selecting one of the options provided in the first menu 325 associated with that editable unit 320C. In other words, the method can include optionally modifying, on the display, the first editable unit 320C of the first portion 315A of editable text 315 based on another user-originated menu action (e.g., selecting an option displayed in the first menu 325). As described above, each user-originated menu action can be, for example and without limitation, a user input or command received via a computer mouse or keyboard.

After the associated user has an opportunity to edit the marked editable unit (e.g., unit 320C in FIG. 3D), the method includes the step of unmarking, on the display, the editable unit 320C. As discussed above and with reference to FIGS. 3A-3D, each editable unit 320A, 320B, 320C of the emphasized portion 315A of editable text 315 is sequentially marked and unmarked as the associated user has an opportunity to edit each of the marked units (i.e., based on user-originated editing actions and user-originated menu actions).

Thus, for example, the method can include the steps of marking a second editable unit of the first portion 315A of editable text, displaying at least a first menu 325 associated with the second editable unit based on a user-originated menu action, and optionally modifying the second editable unit of the first portion 315A of editable text 315 based on the user-originated menu action.

Figure 3E:
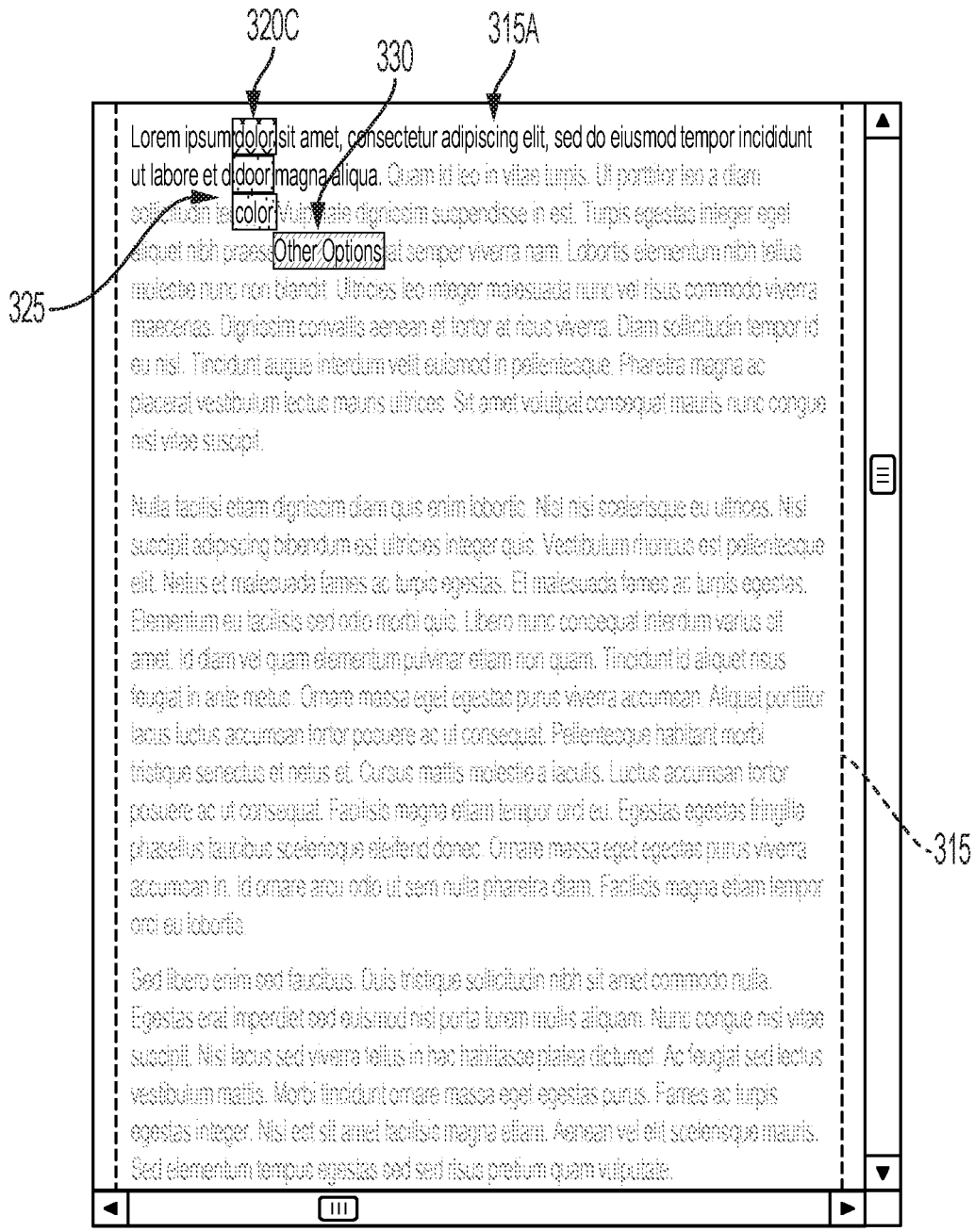

With reference to FIG. 3E, the methods disclosed herein may include the step of displaying, on the display, at least a second menu 330 associated with the first editable unit 320C based on a user-originated menu action. In particular embodiments, the second menu 330 is proximately located to the first menu 325 and includes additional options for editing the first editable unit 320C. In some embodiments, the second menu 330 is also automatically emphasized similar to the first menu 325, for example, by highlighting the text. In further embodiments, the second menu 330 may be emphasized differently from the first menu 325, such as highlighting in a different color.

Figure 3F:
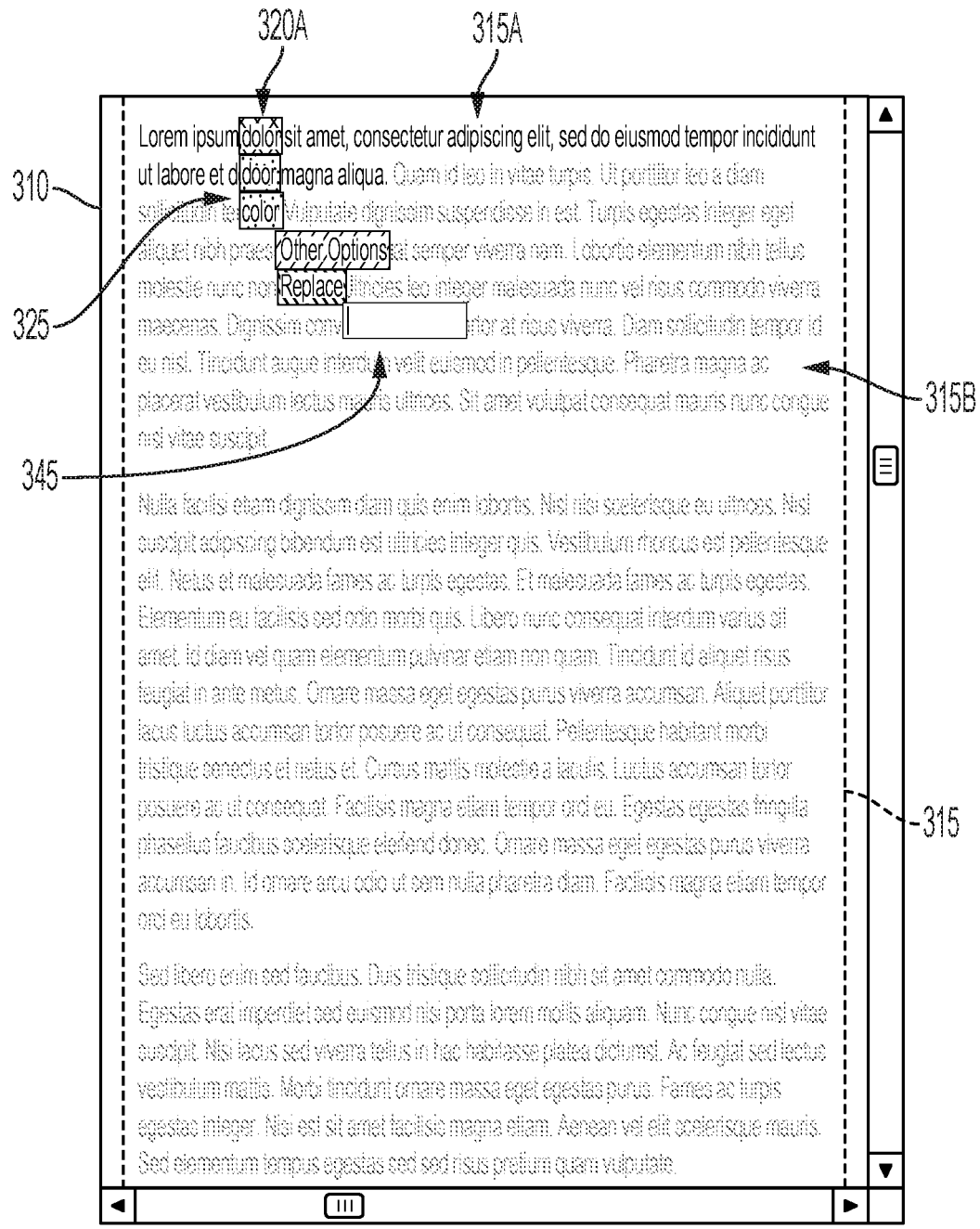

With reference to FIG. 3F, the methods disclosed herein can include the step of displaying, on the display, at least a third menu 340 associated with the first editable unit 320C based on a user-originated menu action. As illustrated in FIG. 3F, the third menu 340 is proximately located to the second menu 330 and similarly emphasized. In certain embodiments, selecting an option in the third menu 330 (i.e., based on a user-originated menu action) causes a text box 345 to be displayed on the display, wherein the associated user may, for example, enter via a user input device, text. For example, the third menu 340 may include an option to "replace" the first editable unit 320C and, based on a user-originated menu action, display a text box 345 wherein the user may enter text to replace the first editable unit 320C. In other words, the method can include optionally modifying, on the display, the editable units 320A, 320B, 320C based on a user-originated menu action (i.e., entering replacement text) associated with the second or third menus 330, 340.

These and other aspects of the present disclosure are now described in more detail with respect to FIGS. 4A-8J.

Figure 4A:
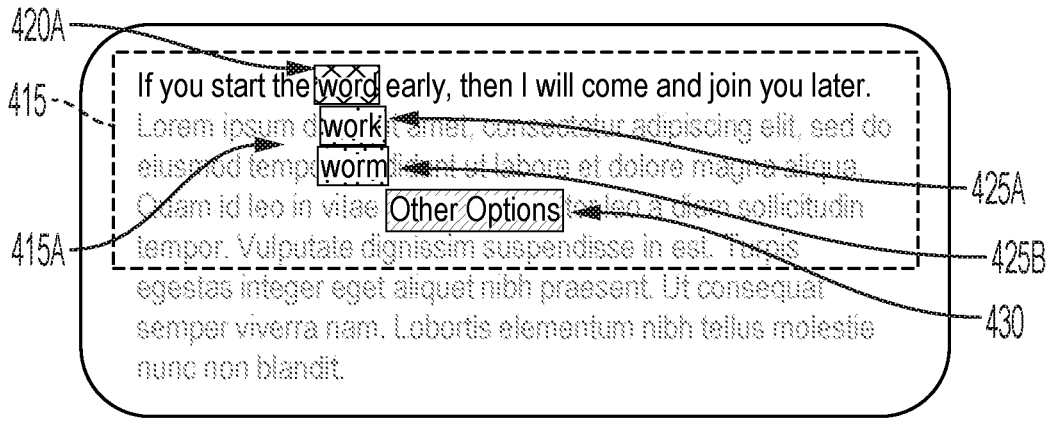
FIGS. 4A-4C illustrate the word verification editing and nested menus in accordance with another aspect of the present disclosure.
Figure 4B:
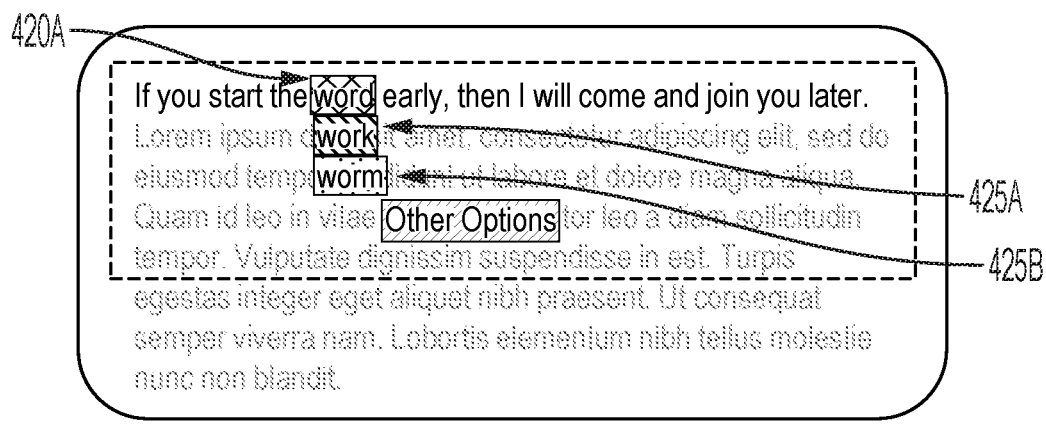
Figure 4C:
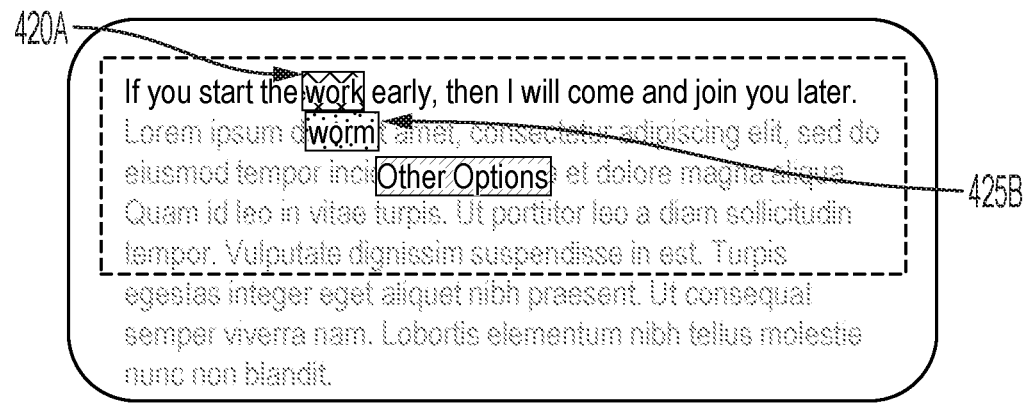

With reference to FIGS. 4A-4C, a first portion 415A of editable text 415 is emphasized and an editable unit 420A is marked. Based on a user-originated menu action, a first 425 and second 430 menu associated with the editable unit 420A is displayed. The first menu 425 includes recommended alternate texts 425A, 425B for the marked editable unit 420A. In FIG. 4B, the recommended alternate text "work" 425A is emphasized based on a user-originated menu action. By selecting the alternate text 425A from the first menu 425, the associated user can replace the editable unit 420A with the recommended text 425A, as shown in FIG. 4C.

Figure 5A:
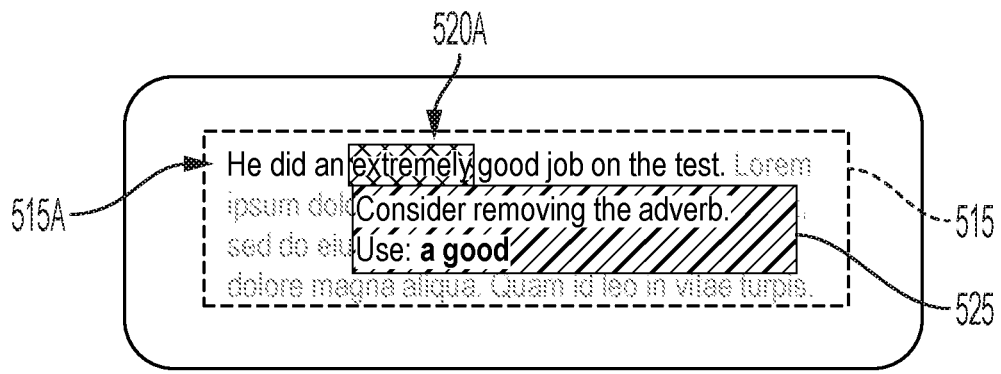
FIGS. 5A-5C illustrate the word verification editing in accordance with one aspect of the present disclosure.
Figure 5B:
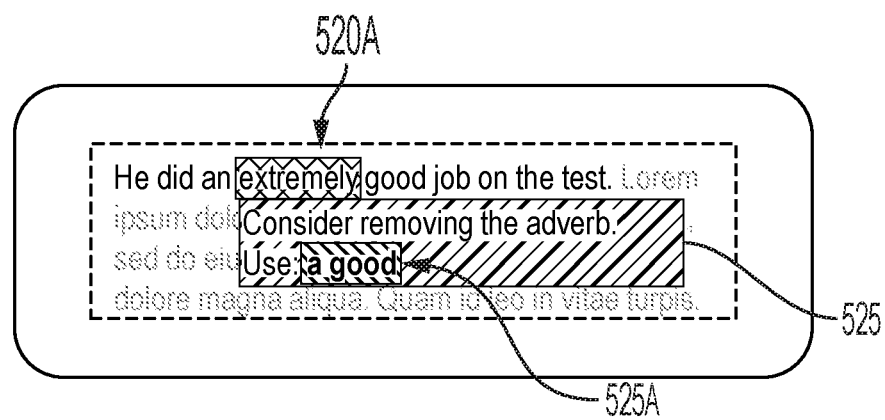
Figure 5C:
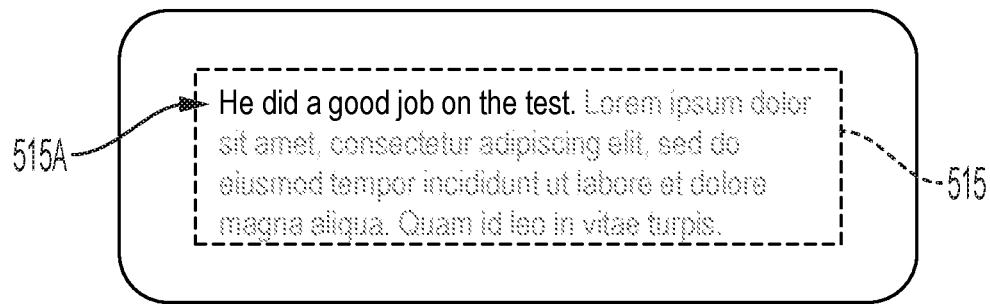

With reference to FIGS. 5A-5B, the first menu 525 associated with an editable unit 520A of a first portion 515A of editable text 515 may be alternately embodied depending on the categorization of the editable unit 520A. For example, as shown in FIGS. 5A and 5B, the editable unit 520A is an adverb and the first menu 525 (to be displayed on the display) includes alternate text 525A recommending removal of the adverb. In FIG. 5B, the alternate text 525A is highlighted based on a user-originated menu action (i.e. selecting). Then, as shown in FIG. 5C, the recommended alternate text 525A replaces the text of the editable unit 520A based on a user-originated menu action.

Figure 6A:
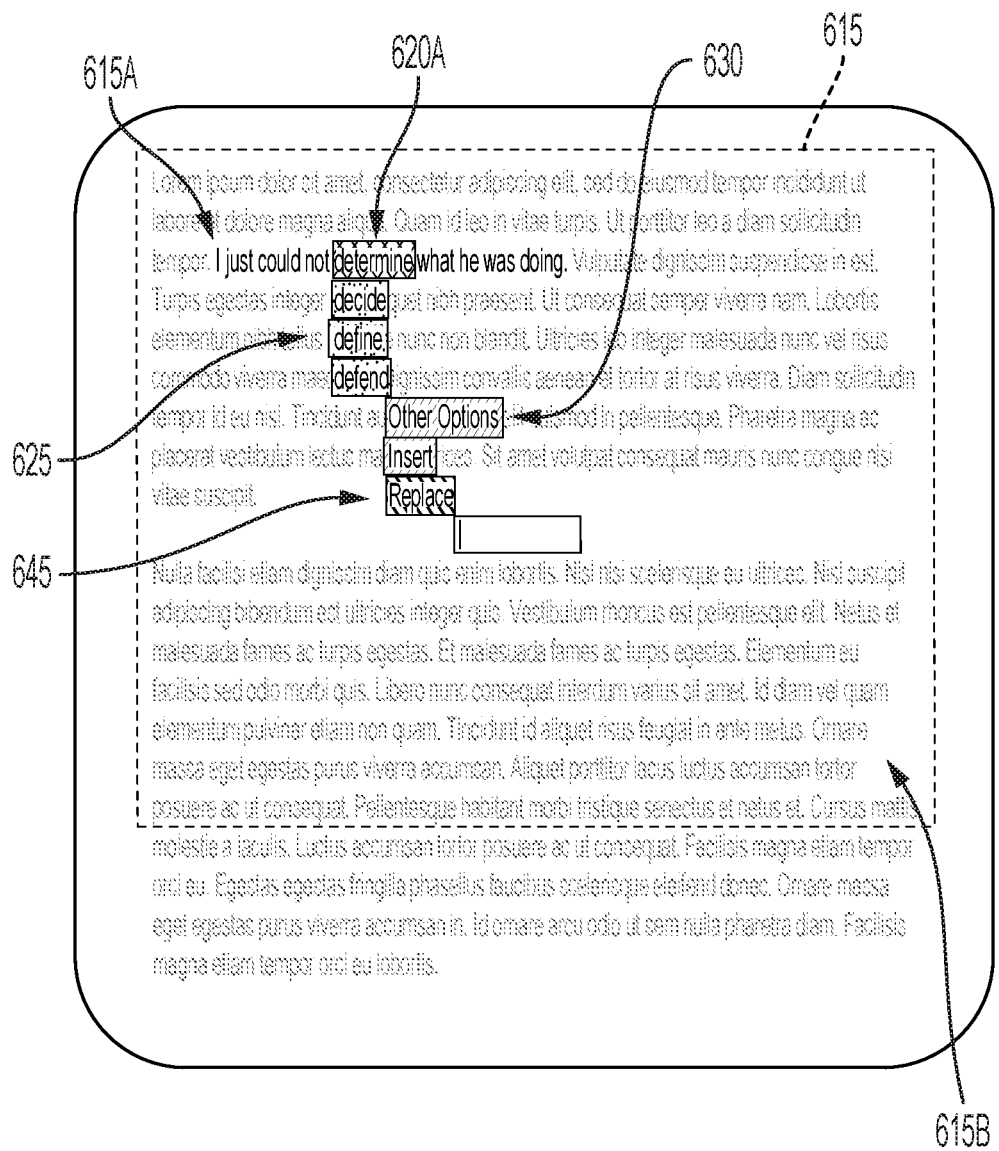
FIGS. 6A-6E illustrate the word verification editing and nested menus in accordance with yet another aspect of the present disclosure.
Figure 6B:
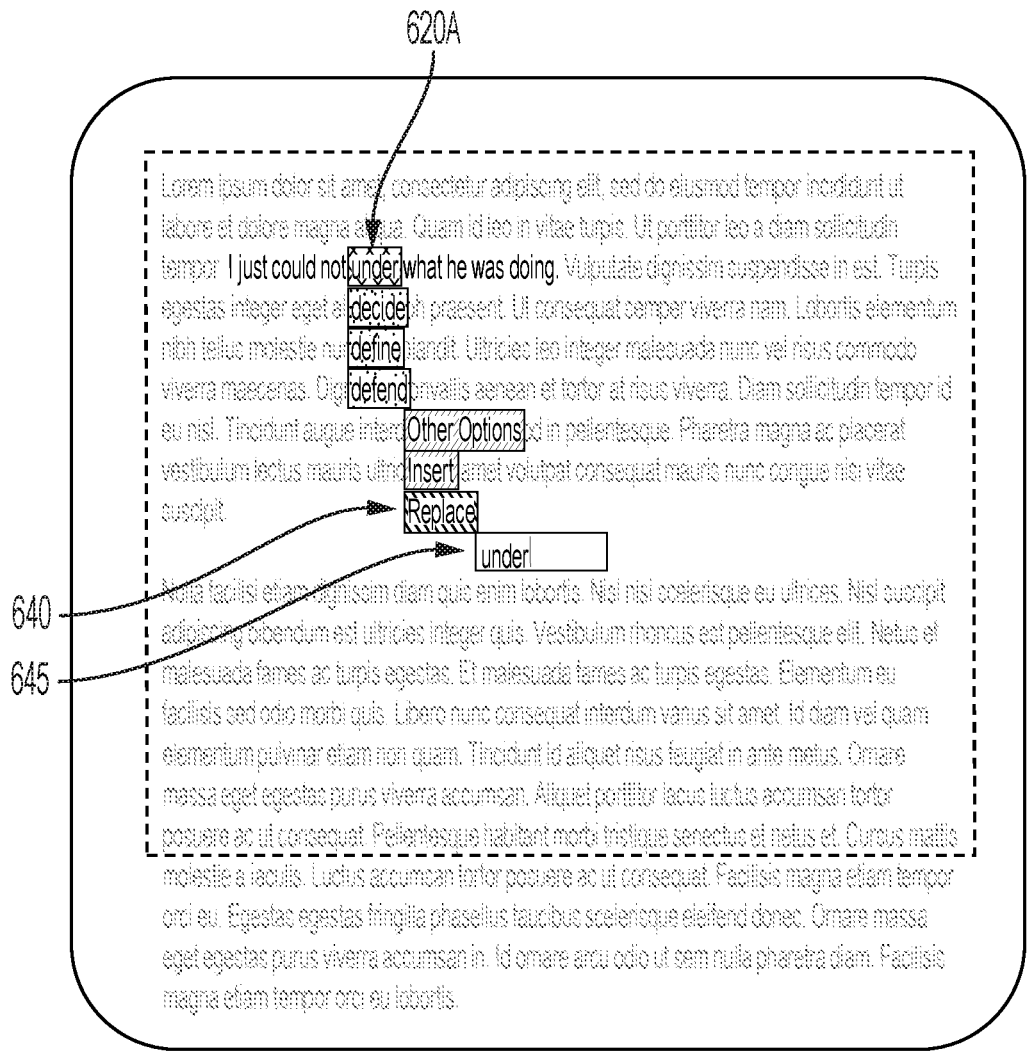
Figure 6C:
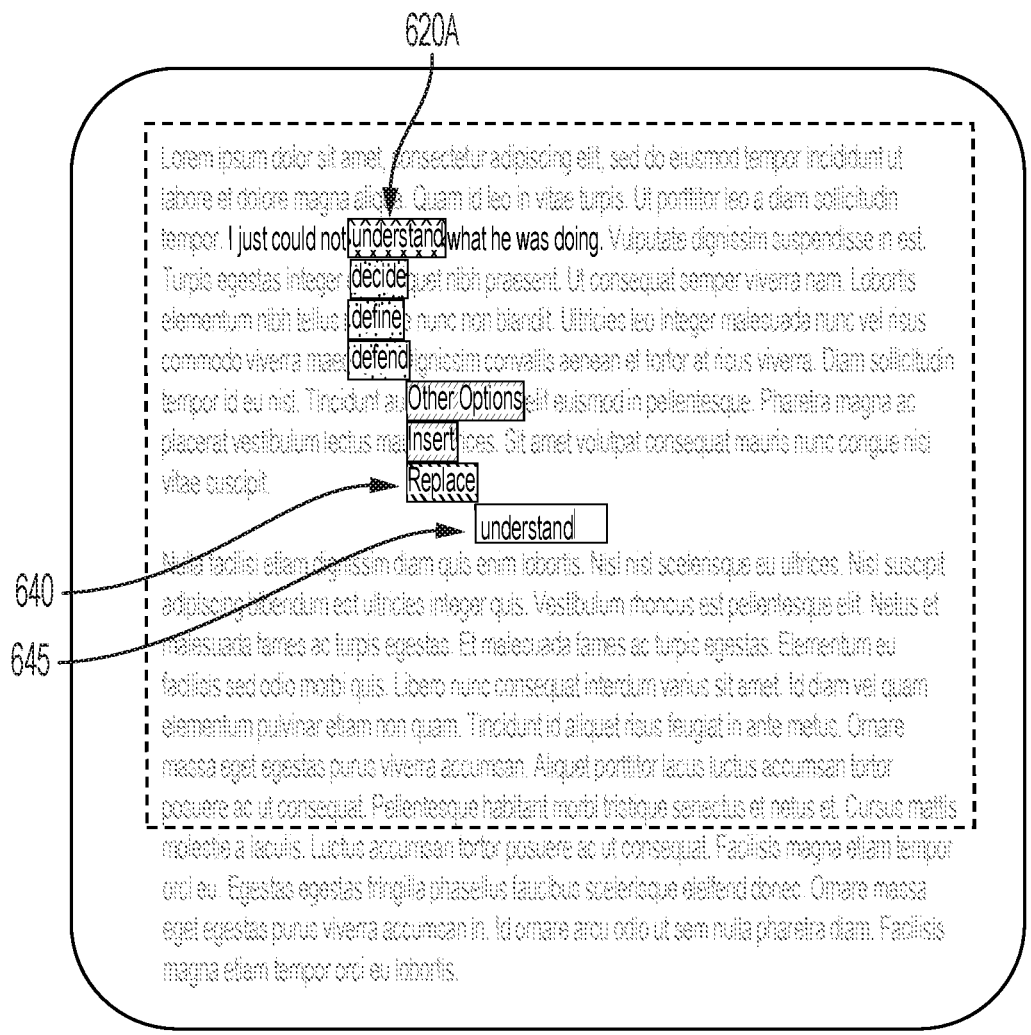

Turning to FIGS. 6A-6E, another aspect of the method of editing editable text 615 is illustrated. As shown in FIG. 6A, a first portion 615A of the editable text 615 is emphasized and a second portion 615B is de-emphasized. An editable unit 620A is marked, and menus 625, 630, and 640 are displayed based on user-originated menu actions. Because the option "Replace" has been selected based on a user-originated menu action, as indicated by the highlighting, a text box 645 is displayed, allowing an associated user to enter text. In particular embodiments, as shown in FIGS. 6B and 6C, as the associated user enters text into the text box 645, the text of the editable unit 620A is automatically updated as the user types.

Figure 6D:
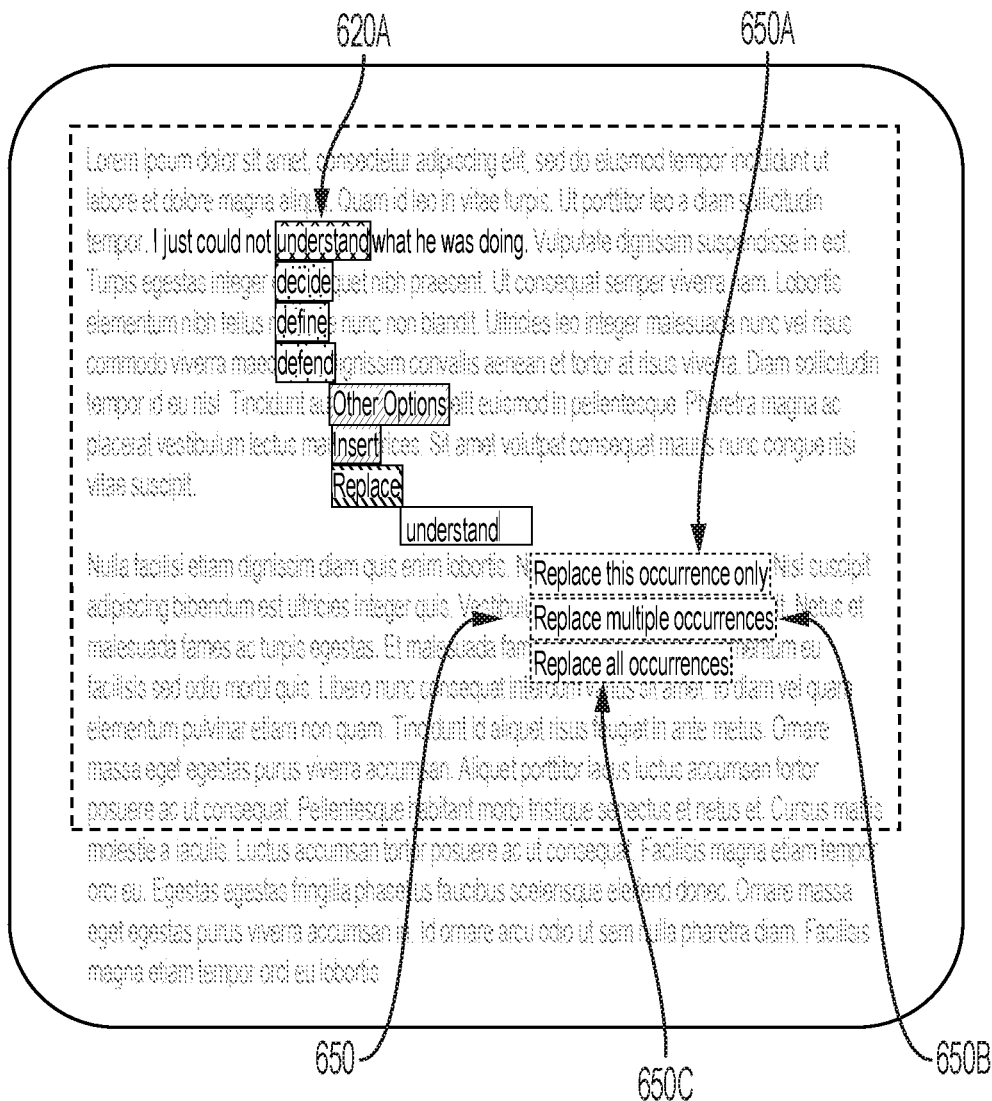
Figure 6E:
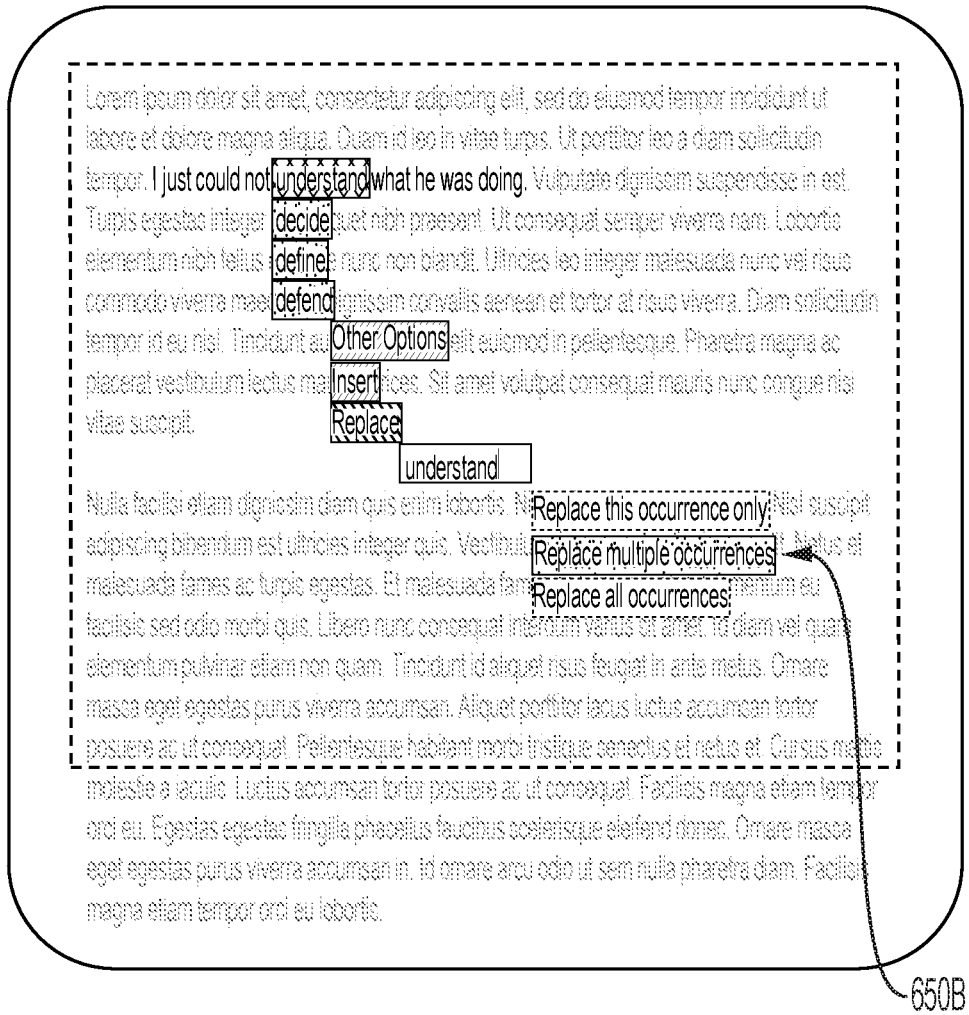

In further embodiments, a fourth menu 650 associated may be displayed in association with an editable unit 620A based on a user-originated menu action. For example, as shown in FIG. 6D, a fourth menu 650 is displayed in proximity to the text box 645 and provides options 650A, 650B, 650C for replacing only the currently marked editable unit 620A (i.e. option 650A), replacing multiple occurrences matching the currently marked editable unit 620A (i.e. option 650B), and replacing all occurrences matching the currently marked editable unit 620A (i.e. option 650C). Any of these options 650A, 650B, 650C may be selected via a user-originated menu action. For example, as shown in FIG. 6E, the second option 650B is selected as indicated by the emphasized highlighting.

Turning to FIGS. 7A-7J, another aspect of the method of editing a document containing editable text 715 is illustrated. As illustrated in FIGS. 7A-7D and described above, the methods disclosed herein may include displaying on a display (not shown) at least one menu associated with an editable unit, such as menus 725, 730, 740 associated with editable unit 720A.

Figure 7A:
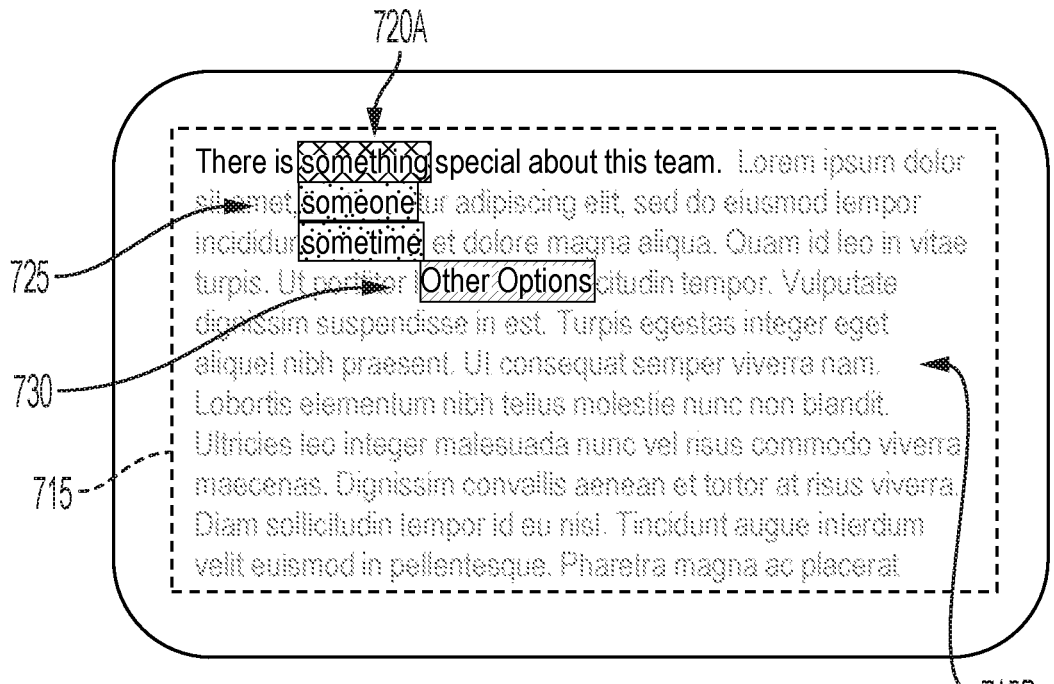
FIGS. 7A-7J illustrate the word verification editing and nested menus in accordance with another aspect of the present disclosure.

In particular embodiments, at least one of the menus 725, 730, 740 displayed include options for recommended alternate text, such as menu 725 illustrated in FIG. 7A. In further embodiments, at least one of the menus 725, 730, 740 displayed include an option for replacing the text of the editable unit, such as menu 740.

Figure 7B:
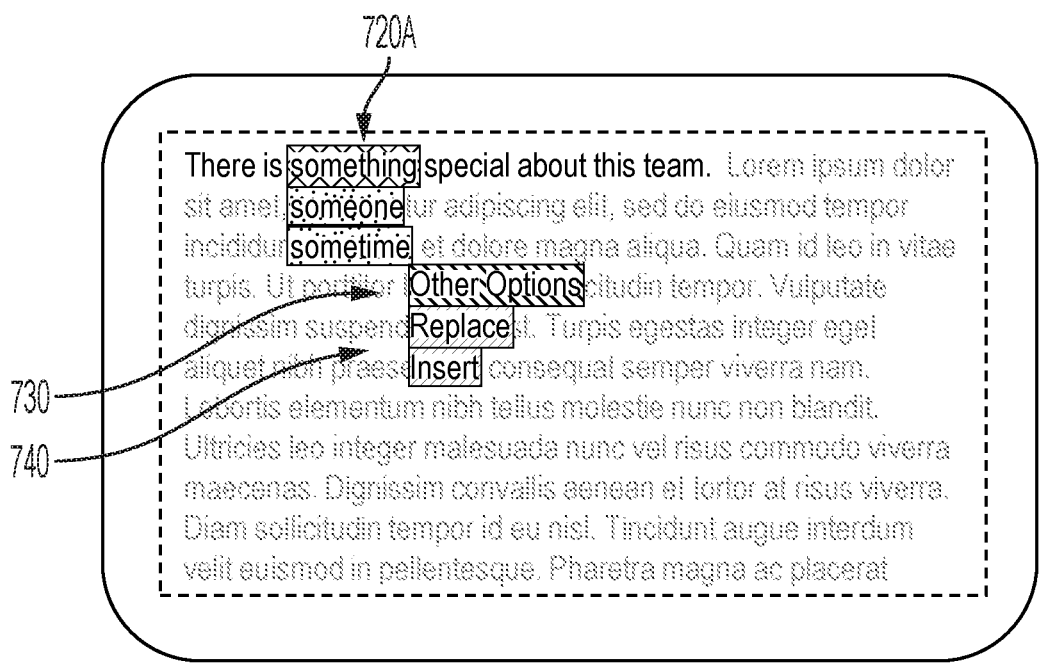
Figure 7C:
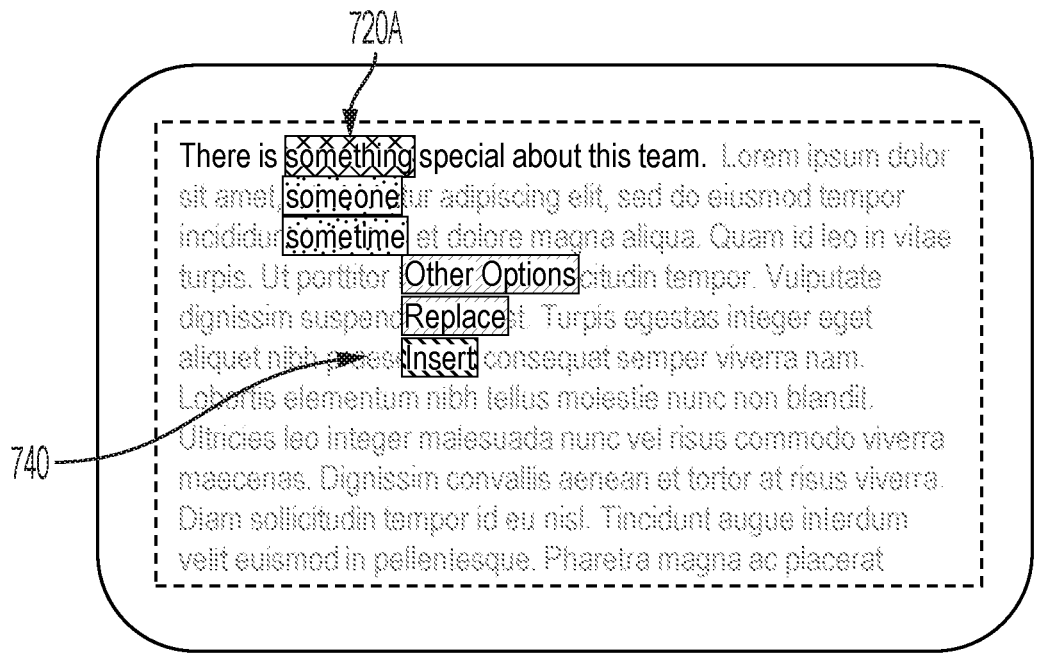

In still further embodiments, at least one of the menus 725, 730, 740 displayed can include an option for inserting text, such as menu 740 as illustrated in FIG. 7B. These menu options may be selected via a user-originated menu action. For example, as illustrated in FIG. 7C, the "Insert" option is displayed as being selected based on such a user-originated menu action.

Figure 7D:
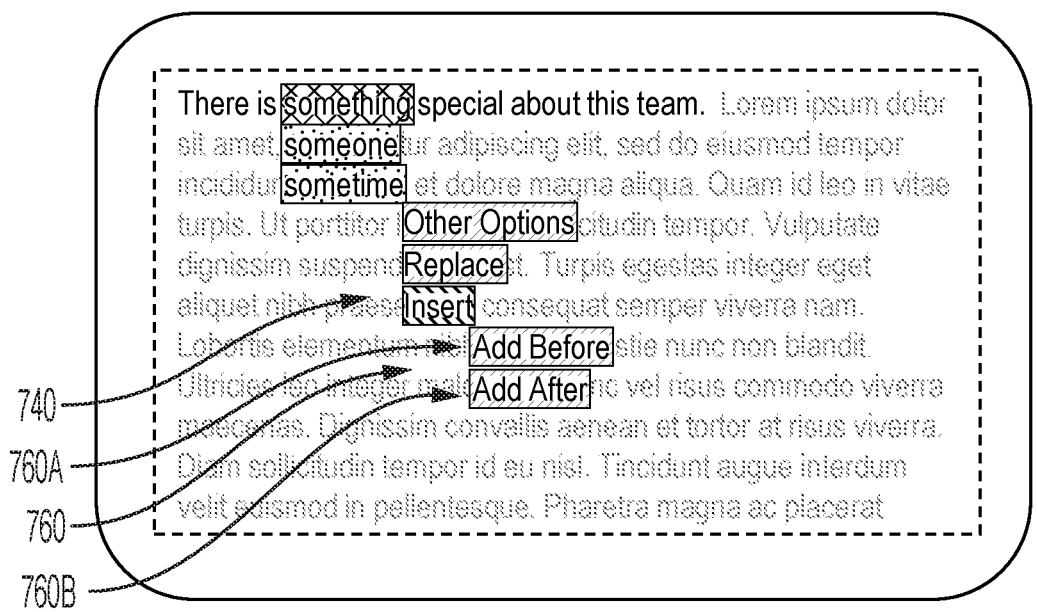
Figure 7E:
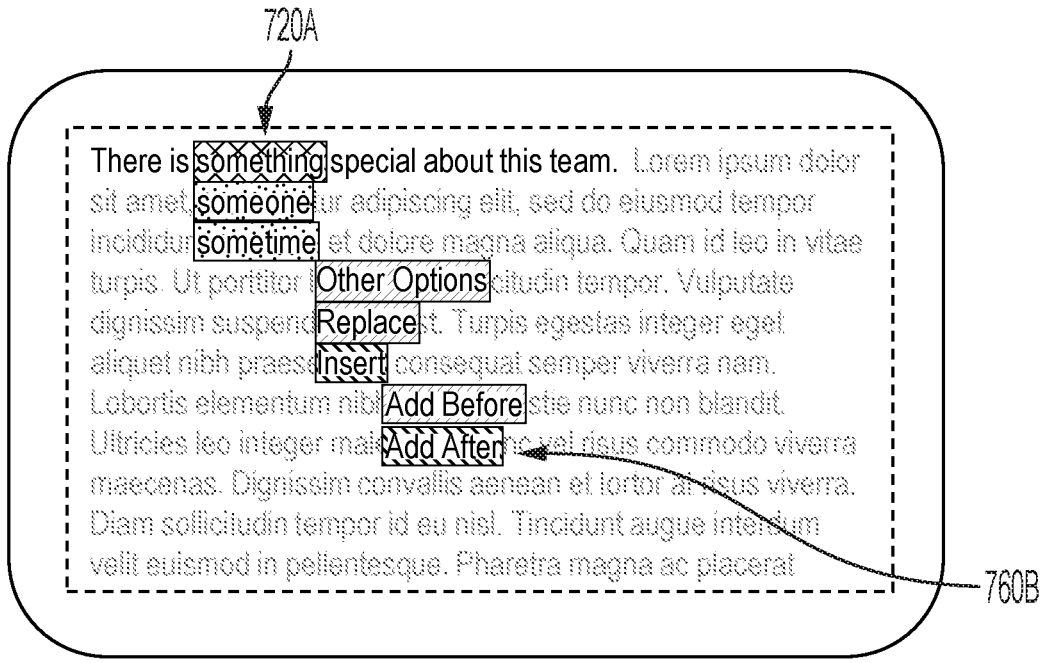
Figure 7F:
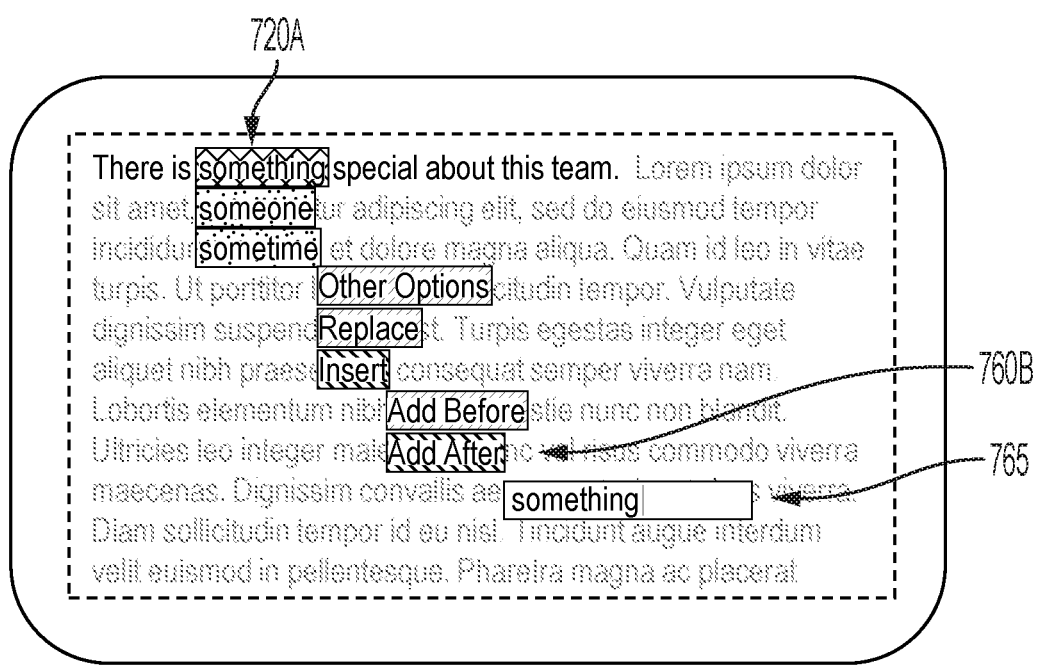

As shown in FIG. 7D, selecting an option may trigger another menu 860 associated with an editable unit 720A to be displayed, which may include one or more additional options 760A, 760B (e.g., "Add Before", "Add After", etc.). These options 760A, 760B may be selected via a user-originated menu action, as shown in FIGS. 7E and 7F. For example, selecting the "Add After" option 760B based on a user-originated menu action triggers a text box 765 to be displayed in proximity to the menu 760, wherein an associated user may enter text.

Figure 7G:
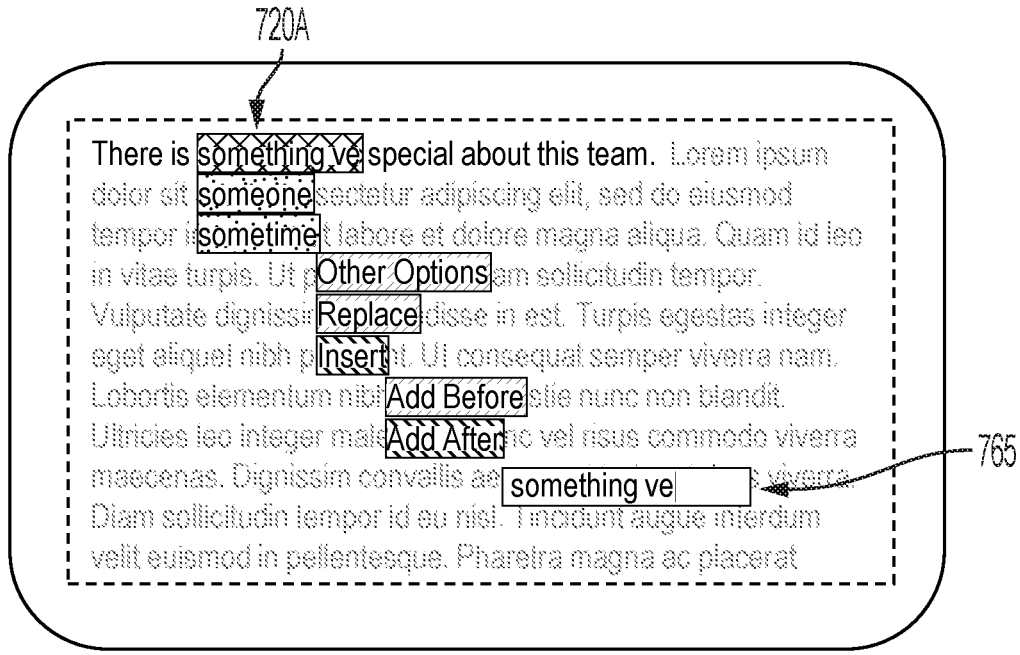
Figure 7H:
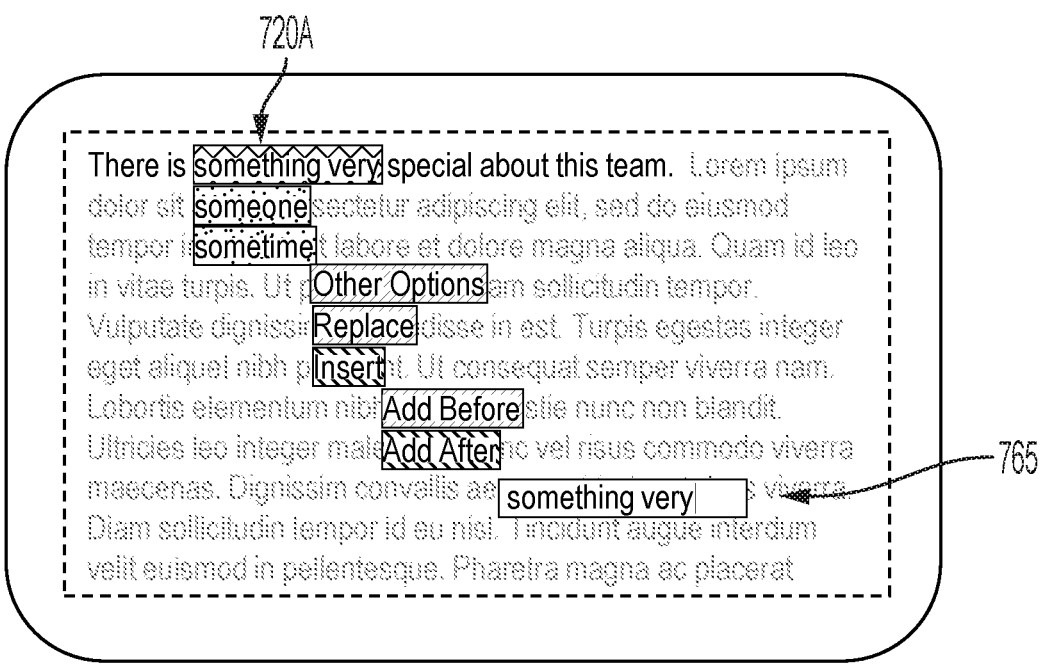

In particular embodiments, the text box 765 may automatically display the text of the associated editable unit 720A (i.e., "something"). By entering text in the text box 765, the text of the editable unit 720A may be automatically updated as the user types, as illustrated in FIGS. 7G and 7H. In other words, the method may include the step of optionally modifying the editable unit 720A based on a user-originated menu action such as selecting the "Insert After" option and entering new text.

Figure 7I:
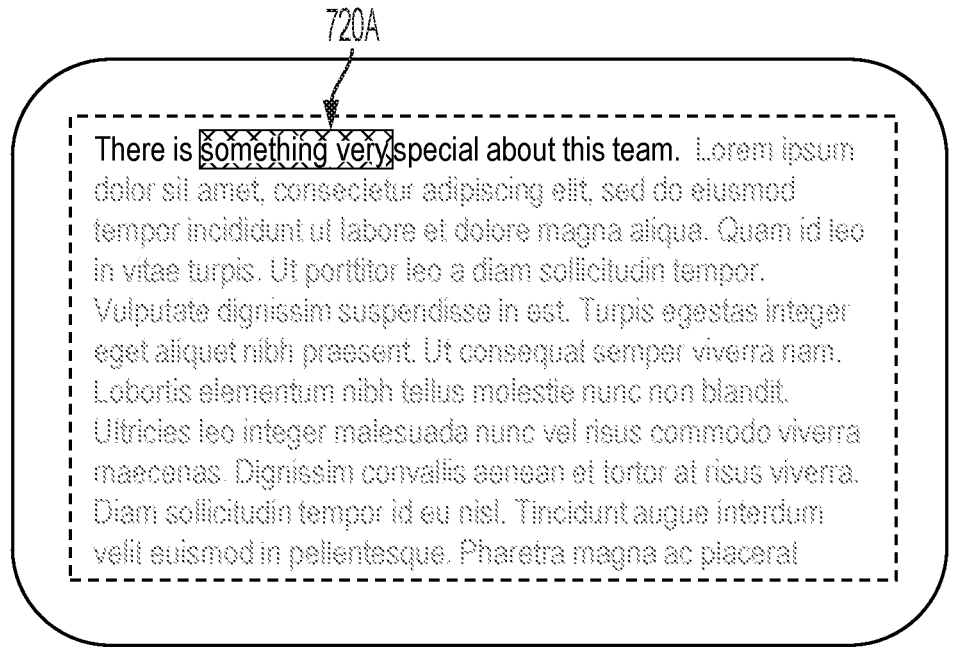
Figure 7J:
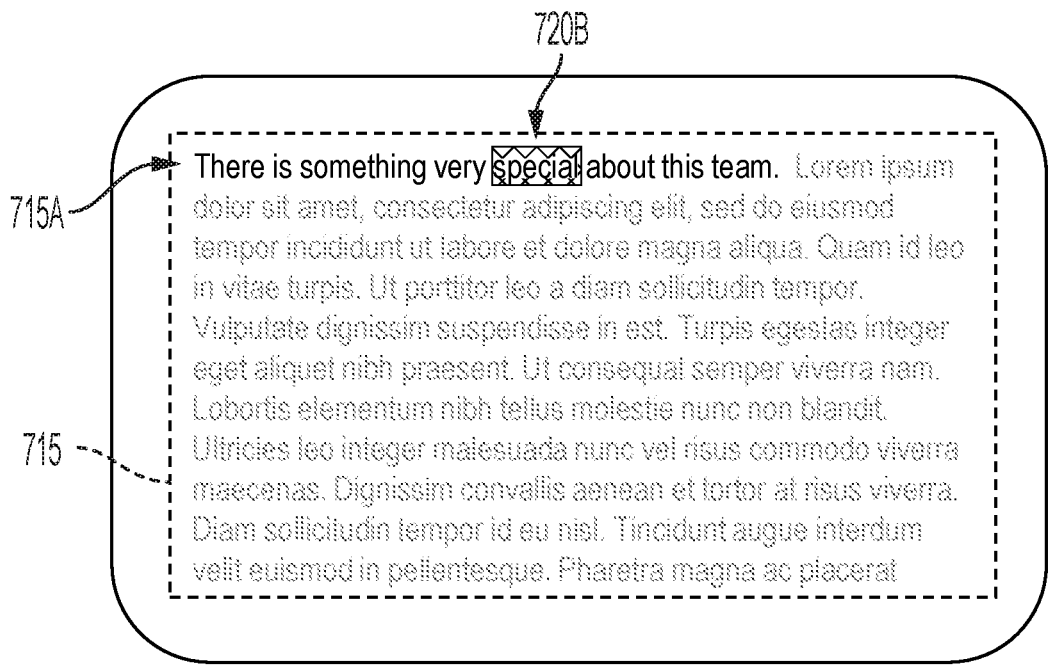

Turning to FIGS. 7I and 7J, after the associated user finishes making edits to the editable unit 720A, the user may close the one or more associated menus 725, 730, 740, 760 via another user-originated menu action. Then, the user may advance the editing process to the next sequential editable unit 720B within the first portion 715A of the editable text 715 via a user-originated editing action.

Each of the editing actions discussed herein may be repeated sequentially for each editable unit 320A, 320B, 320C, 420A, 520A, 620A, 720A of each emphasized portion 315A, 415A, 515A, 615A, 715A of editable text 315, 415, 515, 615, 715. That is, the editing steps may be repeated for a first editable unit, a second editable unit, a third editable unit, as so on, for each editable unit of the emphasized portion.

Further, the editing actions discussed herein may be repeated sequentially for each portion 315A, 415A, 515A, 615A, 715A of editable text 315, 415, 515, 615, 715. For example, once an associated user has the opportunity to optionally modify each editable unit of a first portion 315A, 415A, 515A, 615A, 715A of editable text 315, 415, 515, 615, 715, the user may advance to the next sequential portion (e.g., sentence) of editable text. In other words, the methods disclosed herein may include the steps of: (1) determining a first portion 315A, 415A, 515A, 615A, 715A of editable text 315, 415, 515, 615, 715; (2) emphasizing the first portion 315A, 415A, 515A, 615A, 715A; (3) de-emphasizing at least a second portion 315B, 315C, 415B, 515B, 615B, 715B; (4) optionally modifying one or more of the editable units 320A, 320B, 320C, 420A, 520A, 620A, 720A of the first portion; (5) determining a next sequential portion of the editable text 315, 415, 515, 615, 715; (6) emphasizing the next sequential portion of the editable text 315, 415, 515, 615, 715; (7) de-emphasizing at least a third portion, wherein the third portion includes the first portion; and (8) optionally modifying one or more of the editable units of the next sequential portion of editable text 315, 415, 515, 615, 715. In particular embodiments, the next sequential portion of editable text may be the sentence following the previously emphasized portion, and the editing process may be repeated for each sentence of the editable text 315, 415, 515, 615, 715.

Figure 8:
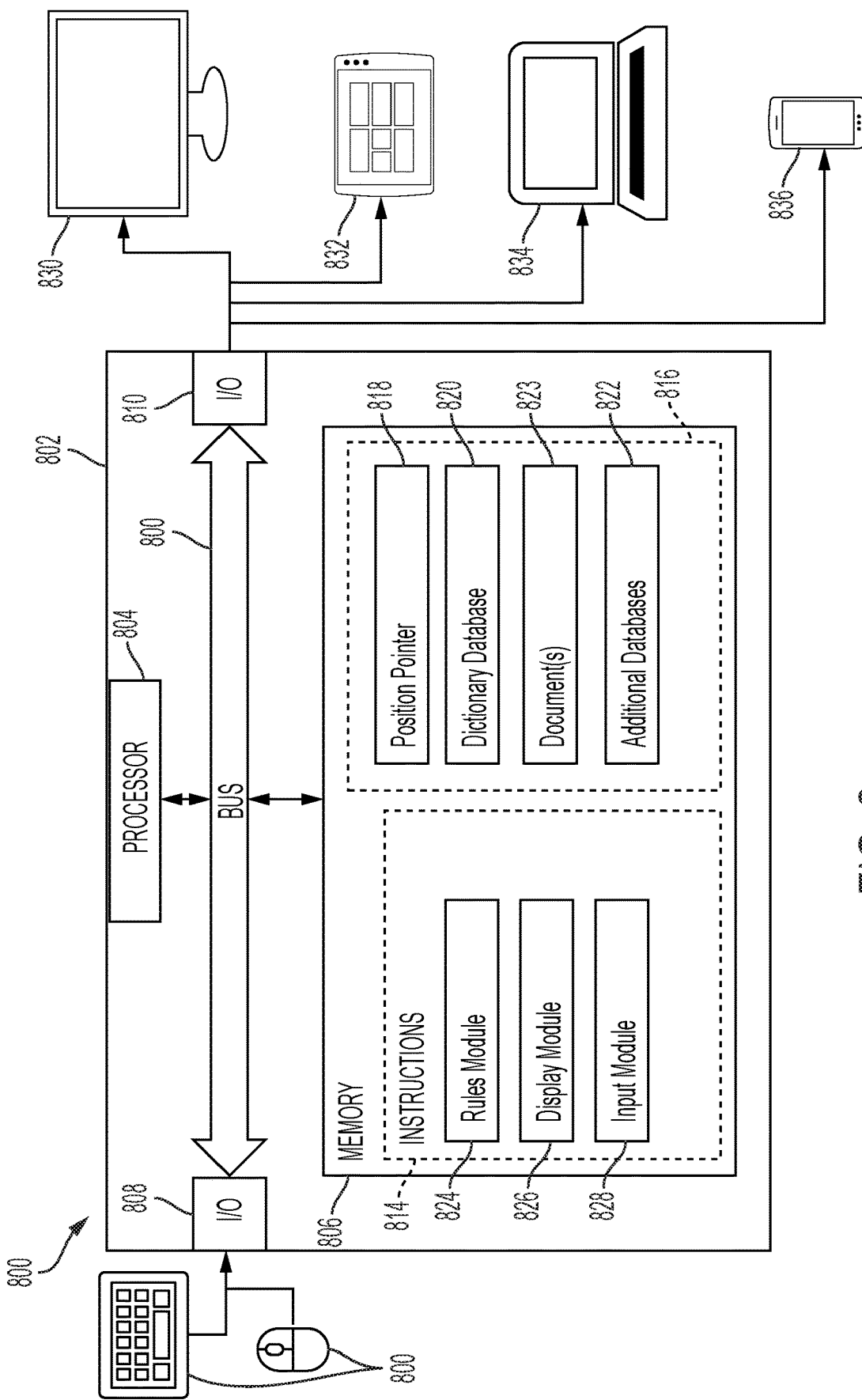
FIG. 8 illustrates a block diagram for a system for word verification editing for simple and detailed text editing in accordance with still another aspect of the present disclosure.

The various components of the systems and methods described above are now discussed in more detail with reference to FIG. 8. FIG. 8 illustrates a block diagram of a system 800 for the simple (i.e., user-friendly) and detailed editing of a document. The system 800 includes an editing device 802 having a processor 804, a memory 806, and input/output (I/O) interfaces 808, 810. A controller/bus 812 may operatively connect the processor 804, memory 806, and I/O interfaces 808, 810 together. The memory 806 includes instructions 814 for performing at least a part or all of the steps/actions discussed above. The processor 804 can be configured to execute the instructions 814 for performing the editing of a document. A portion 816 of the memory 806 may be used to track the progress of the editing process (e.g., using a position pointer 818), and may also store additional databases useful for the editing of a document, including, for example and without limitation, one or more dictionaries 820, and thesauruses and/or non-English dictionaries 822. In certain embodiments, the memory 806 can also store the one or more documents 823 that may be edited.

In particular embodiments, the instructions 814 stored in memory 806 may include one or more of a rules module 824, a display module 826, and an input module 828. The rules module 824, display module 826, and input module 828 may be configured to perform (when executed by the processor 804) one or more of the steps/actions described in the methods above.

For example, the rules module 824 may be configured to determine a plurality of portions the editable text of a document, such as determining a first and second portion of the editable text. In particular embodiments, the rules module 824 can sequentially determine a plurality of portions of the text to be edited. The rules module 824 may also be configured to generate the menu options (e.g., options 725, 730, 740 in FIG. 7A) to be displayed in one or more menus. In certain embodiments, the rules module 824 may be configured to generate recommended alternate text to be displayed in a menu based on one or more of the other databases 820, 822 stored in memory 806. Finally, the rules module 824 can also be configured to modify the document(s) 823 in the memory 806 based on the edits made by a user associated with the system 800. That is, once an editable unit of text has been edited based on a user-originated menu action, the rules module 824 may store the modified editable unit in the document(s) 823 in the memory 806.

In further embodiments, the system 800 further includes a display 830, 832, 834, 836 and the display module 826 may be configured to control the display 830, 832, 834, 836. The display may be, for example and without limitation, a TV/monitor 830, a tablet 832, a computer screen 834, and/or a mobile device screen 836. In particular embodiments, the display module 826 is configured to: (1) display, on a display 830, 832, 834, 836, a document or a portion thereof; (2) emphasize, on the display 830, 832, 834, 836, one or more portions of the document, including editable text; (3) de-emphasizing, on the display 830, 832, 834, 836, one or more portions of the document, including editable text; (4) marking and/or unmarking, on the display 830, 832, 834, 836, one or more editable units of the editable text; (5) displaying, on the display 830, 832, 834, 836, one or more menus generated by the rules module 824; and (6) updating the display 830, 832, 834, 836 to display one or more modified editable units (i.e., updating the display 830, 832, 834, 836 to display a modified editable unit rather than the original editable unit).

In still further embodiments, the system 800 may include a user input device 838, such as a computer mouse or computer keyboard, and the instructions 814 may include an input module 828 configured to interpret the input received from the user input device(s) 838 as a user-originated menu action and/or a user-originated editing action.

The user input device(s) 383 and the displays 830, 832, 834, 836 may communicate with and be controlled by the editing device 802 via I/O interfaces 808, 810. That is, for example, the I/O interface 808 can receive input from a user via the user input device(s) 838, and output display graphics to the display 830, 832, 834, 836 via I/O interface 810.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art, which are also intended to be encompassed by the following claims.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed is:

1. A computer-implemented method of reviewing and editing text included in a document, the method of reviewing and editing text operatively associated with a word processing system including a user input device configured to receive input from an associated user, wherein the input can be user-originated menu action or a user-originated editing action, a display configured to display at least a portion of the document, and an editing device including a processor and a memory configured to store instructions to execute the method of reviewing and editing text by the processor, the method of reviewing and editing text comprising:

displaying, on the display, a portion of the document, wherein the portion of the document includes a plurality of word sentences, the word sentences composed of a sequence of editable text;

determining a first and a second portion of the editable text, the first and second portion each including a subset of editable text included in the displayed portion of the document;

de-emphasizing, on the display, the second portion of the editable text, wherein de-emphasizing includes one or more of modifying font, highlighting, modifying text background, underlining, bolding, and italicizing;

emphasizing, on the display, the first portion of the editable text, wherein the first portion of the editable text includes a plurality of editable units, wherein emphasizing is distinct from de-emphasizing and emphasizing includes one or more of modifying font, highlighting, modifying text background, underlining, bolding, and italicizing;

marking, on the display, a first editable unit of the first portion of the editable text, wherein marking is distinct from de-emphasizing and distinct from emphasizing, and marking includes one or more of modifying font, highlighting, modifying text background, underlining, bolding, and italicizing, and the first editable unit includes editable text representative of a correctly spelled word;

displaying, on the display, a first drop-down menu associated with the first editable unit based on a user-originated menu action, the first menu proximately located near the marked first editable unit and the first drop-down menu displaying at least one user selectable alternative textual representations of the first editable unit and providing a user selectable feature for the user to select other user selectable options;

modifying, on the display, the first editable unit of the first portion of editable text based on the user-originated menu action, the first editable unit being modified in response to a user input associated with the first drop-down menu; and after modifying the first editable unit, unmarking, on the display, the first editable unit of the first portion of the editable text, and marking, on the display, a second editable unit of the first portion of the editable text, wherein the second editable unit is associated with a next editable text of the sequence of editable text and marking is distinct from de-emphasizing and distinct from emphasizing, and marking includes one or more of modifying font, highlighting, modifying text background, underlining, bolding, and italicizing, and the second editable unit includes editable text representative of a correctly spelled word.

2. The computer-implemented method of reviewing and editing text included in a document of claim 1, wherein the method further comprises:

displaying, on the display, at least the first drop-down menu associated with the second editable unit based on the user-originated menu action, the first menu proximately located near the marked first editable unit and the first drop-down menu displaying at least one user selectable alternative textual representations of the second editable unit and providing a user selectable feature for the user to select other user selectable options;

modifying, on the display, the second editable unit of the first portion of editable text based on the user-originated menu action, the second editable unit being modified in response to a user input associated with the first drop-down menu; and after modifying the second editable unit, unmarking, on the display, the second editable unit of the first portion of the editable text, and marking, on the display, a third editable unit of the first portion of the editable text, wherein the third editable unit is associated with a next editable text of the sequence of editable text and marking is distinct from de-emphasizing and distinct from emphasizing, and marking includes one or more of modifying font, highlighting, modifying text background, underlining, bolding, and italicizing, and the third editable unit includes editable text representative of a correctly spelled word.

3. The computer-implemented method of reviewing and editing text included in a document of claim 1, wherein the method further comprises:

displaying, on the display, a second drop-down menu associated with the first editable unit based on a user-originated menu action, the second menu proximately located near the marked first editable unit and proximately located near the first drop-down menu, the second menu displaying the other user selectable options selectable from the first drop-down menu and the second menu providing a user selectable feature for the user to perform one or more of replacing text, inserting text, inserting text before and inserting text after.

4. The computer-implemented method of reviewing and editing text included in a document of claim 1, wherein the first portion of the editable text comprises at least one of a word or a punctuation mark.

5. The computer-implemented method of reviewing and editing text included in a document of claim 1, wherein the second portion of editable text comprises at least one of a word or a punctuation mark.

6. The computer-implemented method of reviewing and editing text included in a document of claim 1, wherein each of the plurality of editable units consists of a word or a punctuation mark.

7. A system for editing a document having editable text, the system comprising:
　a user input device configured to receive input from an associated user, wherein the input can be user-originated menu action or a user-originated editing action;
　a display configured to display at least a portion of the document; and
　an editing device comprising a processor and a memory configured to store instructions to be executed by the processor;
　wherein the memory includes:
　　a rules module configured to:
　　　(i) determine a plurality of portions of the editable text;
　　　(ii) generate one or more menus associated with a plurality of editable units of the editable text;
　　　(iii) modify one or more of the editable units of the document, wherein one or more of the editable units includes a word that is spelled correctly;
　　a display module configured to:
　　　(i) display, on the display, a portion of the document wherein the portion of the document includes a plurality of word sentences, the word sentences composed of a sequence of editable text;
　　　(ii) de-emphasize, on the display, one or more portions of the editable text, wherein de-emphasizing includes one or more of modifying font, highlighting, modifying text background, underlining, bolding, and italicizing;
　　　(iii) emphasize, on the display, one or more portions of the editable text, wherein the portion of the editable text includes a plurality of editable units, wherein emphasizing is distinct from de-emphasizing and emphasizing includes one or more of modifying font, highlighting, modifying text background, underlining, bolding, and italicizing;
　　　(iv) marking, on the display, one or more portions of the editable text, wherein marking is distinct from de-emphasizing and distinct from emphasizing, and marking includes one or more of modifying font, highlighting, modifying text background, underlining, bolding, and italicizing;
　　　(v) unmarking, on the display, one or more editable units of the editable text, wherein unmarking is distinct from de-emphasizing and distinct from emphasizing and distinct from marking, and unmarking includes one or more of modifying font, highlighting, modifying text background, underlining, bolding, and italicizing;
　　　(vi) displaying, one the display, one or more menus generated by the rules module, the menus proximately located near the marked editable unit and the menu displaying at least one user selectable alternative textual representations of the marked editable unit and providing a user selectable feature for the user to select other user selectable options; and
　　　(vii) updating the display to display one or more editable units that have been modified based on a user-originated menu action modifying, on the display, the editable unit of the portion of editable text based on the user-originated menu action, wherein the display is updated after the editable unit is modified in response to a user input associated with the menu, and after modifying the editable unit, the updating including unmarking the editable unit of the portion of the editable text, and marking, on the display, a next sequentially located editable unit of the portion of the editable text, wherein the marking is distinct from de-emphasizing and distinct from emphasizing, and marking includes one or more of modifying font, highlighting, modifying text background, underlining, bolding, and italicizing, and the second editable unit includes editable text representative of a correctly spelled word.

8. The system for editing a document having editable text according to claim 7, the display module configured to:
　display, on the display, the drop-down menu associated with the next editable unit based on the user-originated menu action, the drop-down menu proximately located near the marked next editable unit and the drop-down menu displaying at least one user selectable alternative textual representations of the next editable unit and providing a user selectable feature for the user to select other user selectable options;
　modify, on the display, the next editable unit of the portion of editable text based on the user-originated menu action, the next editable unit being modified in response to a user input associated with the drop-down menu; and
　after modifying the next editable unit, unmarking, on the display, the next editable unit of the portion of the editable text, and marking, on the display, a third editable unit of the portion of the editable text, wherein the third editable unit is associated with a next editable text of the sequence of editable text and marking is distinct from de-emphasizing and distinct from emphasizing, and marking includes one or more of modifying font, highlighting, modifying text background, underlining, bolding, and italicizing, and the third editable unit includes editable text representative of a correctly spelled word.

9. The system for editing a document having editable text according to claim 7, the display module configured to:
　display, on the display, a second drop-down menu associated with the editable unit based on a user-originated menu action, the second menu proximately located near the marked editable unit and proximately located near the first drop-down menu, the second menu displaying the other user selectable options selectable from the first drop-down menu and the second menu providing a user selectable feature for the user to perform one or more of replacing text, inserting text, inserting text before and inserting text after.

10. The system for editing a document having editable text according to claim 7, wherein the portion of the editable text comprises at least one of a word or a punctuation mark.

11. The system for editing a document having editable text according to claim 7, wherein each of the plurality of editable units consists of a word or a punctuation mark.

\* \* \* \* \*